US010174609B2

(12) United States Patent
San Martin et al.

(10) Patent No.: US 10,174,609 B2
(45) Date of Patent: Jan. 8, 2019

(54) ESTABLISHING ELECTRICAL COMMUNICATION WITH OUT-OF-CASING COMPONENTS

(71) Applicant: HALLIBURTON ENERGY SERVICES, INC., Houston, TX (US)

(72) Inventors: Luis E. San Martin, Houston, TX (US); Boguslaw Wiecek, Kingwood, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 0 days.

(21) Appl. No.: 15/508,549

(22) PCT Filed: May 25, 2016

(86) PCT No.: PCT/US2016/034038
§ 371 (c)(1),
(2) Date: Mar. 3, 2017

(87) PCT Pub. No.: WO2017/204791
PCT Pub. Date: Nov. 30, 2017

(65) Prior Publication Data
US 2018/0163531 A1    Jun. 14, 2018

(51) Int. Cl.
*E21B 47/12*    (2012.01)
*H02J 50/80*    (2016.01)
(Continued)

(52) U.S. Cl.
CPC ........ *E21B 47/122* (2013.01); *E21B 41/0085* (2013.01); *H02J 50/10* (2016.02); *H02J 50/80* (2016.02)

(58) Field of Classification Search
CPC ............................ E21B 47/12; E21B 47/122
(Continued)

(56) References Cited

U.S. PATENT DOCUMENTS 6,515,592 B1    2/2003    Babour et al.
7,151,377 B2    12/2006    Chouzenoux et al.
(Continued)

FOREIGN PATENT DOCUMENTS

WO    WO 2007004891 A1    1/2007
WO    WO 2014109821        7/2017

OTHER PUBLICATIONS

International Search Report and Written Opinion for International Application No. PCT/US2016/034038 dated May 26, 2016. (15 pages).

*Primary Examiner* — Qutbuddin Ghulamali
(74) *Attorney, Agent, or Firm* — Haynes and Boone LLP

(57) ABSTRACT

A method and system according to which electrical communication is established between a primary circuit positioned inside a downhole tubular and a secondary circuit positioned outside the downhole tubular. In an exemplary embodiment, the method includes positioning the secondary circuit outside the downhole tubular, the secondary circuit including a magnetically permeable secondary core and a secondary winding extending proximate the secondary core; positioning a primary circuit inside the downhole tubular, the primary circuit including a magnetically permeable primary core and a primary winding extending proximate the primary core; and supplying electrical power and/or data to the primary winding with an electrical source so that a magnetic flux is channeled through the primary and secondary cores to induce an electromotive force in the secondary winding, thus establishing electrical communication between the primary and secondary circuits to transfer power and/or data therebetween.

18 Claims, 19 Drawing Sheets

(51) Int. Cl.
*H02J 50/10* (2016.01)
*E21B 41/00* (2006.01)

(58) Field of Classification Search
USPC .................................................. 340/854.6
See application file for complete search history.

(56) References Cited

U.S. PATENT DOCUMENTS

| | | | |
|---|---|---|---|
| 2003/0066671 A1* | 4/2003 | Vinegar | E21B 47/12 174/47 |
| 2004/0263350 A1 | 12/2004 | Vinegar et al. | |
| 2009/0085701 A1 | 4/2009 | Veneruso et al. | |
| 2013/0048269 A1* | 2/2013 | Tarayre | E21B 47/122 166/65.1 |

* cited by examiner ated outside the downhole tubular, could help with the monitoring of oil and gas reservoirs, especially if the method does not require drastic changes to standard procedures. Therefore, what is needed is an apparatus or method to address one or more of the foregoing issues, and/or one or more other issues.

ESTABLISHING ELECTRICAL COMMUNICATION WITH OUT-OF-CASING COMPONENTS

TECHNICAL FIELD

The present disclosure relates generally to power and communications systems for use in oil and gas operations such as drilling, completion, and production, and, more specifically, to a device for establishing electrical communication with out-of-casing components.

BACKGROUND

The placement of permanent sensors (and/or other electronic components) in the annular space between a downhole tubular and the wellbore to monitor oil and gas reservoirs can help to optimize the resource extraction process. However, these sensors are placed behind the downhole tubular and cannot be easily reached once well construction has been completed. Conventional methods require the installation of wires and/or cables in the annular space between the downhole tubular and the wellbore, which is often cost prohibitive. An efficient and cost effective method to deliver power to, and retrieve information from, sensors located outside the downhole tubular, could help with the monitoring of oil and gas reservoirs, especially if the method does not require drastic changes to standard procedures. Therefore, what is needed is an apparatus or method to address one or more of the foregoing issues, and/or one or more other issues.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Figure 1A:
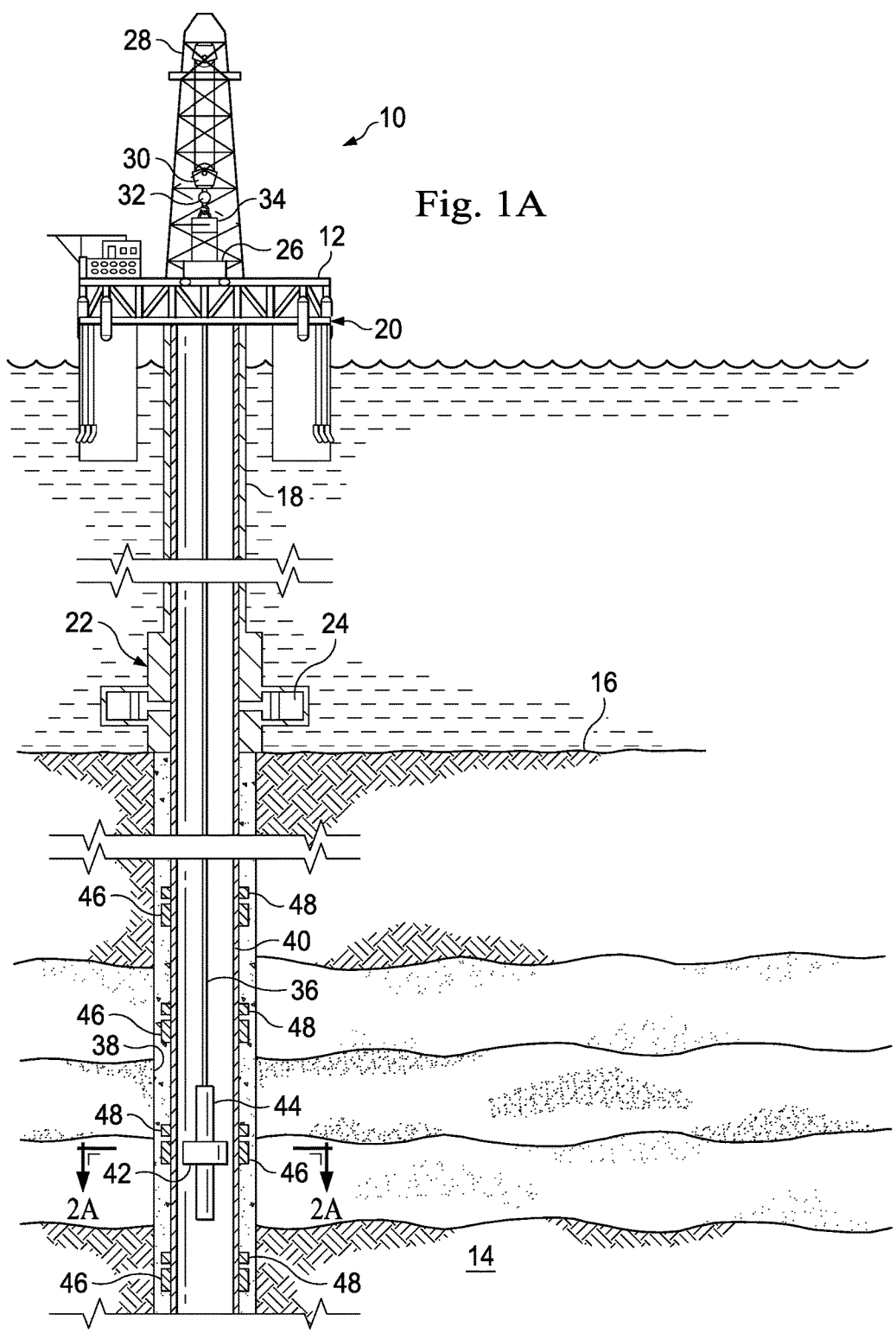
FIG. 1A is a schematic illustration of an offshore oil and gas platform operably coupled to a wireline tool including a primary circuit and being disposed within a downhole tubular about which a secondary circuit extends, according to an exemplary embodiment.

Illustrative embodiments and related methods of the present disclosure are described below as they might be employed in a device for establishing electrical communication with out-of-casing components. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

The following disclosure may repeat reference numerals and/or letters in the various examples or figures. This repetition is for the purpose of simplicity and clarity and does not in itself dictate a relationship between the various embodiments and/or configurations discussed. Further, it should be understood that the use of spatially relative terms such as "above," "below," "upper," "lower," "upward," "downward," "uphole," "downhole," and the like are used in relation to the illustrative embodiments as they are depicted in the figures, the upward and downward directions being toward the top and bottom of the corresponding figure, respectively, and the uphole and downhole directions being toward the surface and toe of the well, respectively. Unless otherwise stated, the spatially relative terms are intended to encompass different orientations of the apparatus in use or operation in addition to the orientation depicted in the figures. For example, if an apparatus in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Although a figure may depict a horizontal wellbore or a vertical wellbore, unless indicated otherwise, it should be understood that the apparatus according to the present disclosure is equally well suited for use in wellbores having other orientations including vertical wellbores, horizontal wellbores, slanted wellbores, multilateral wellbores, or the like. Further, unless otherwise noted, even though a figure may depict an offshore operation, it should be understood that the apparatus according to the present disclosure is equally well suited for use in onshore operations. Finally, unless otherwise noted, even though a figure may depict a cased-hole wellbore, it should be understood that the apparatus according to the present disclosure is equally well suited for use in open-hole wellbore operations.

Figure 1B:
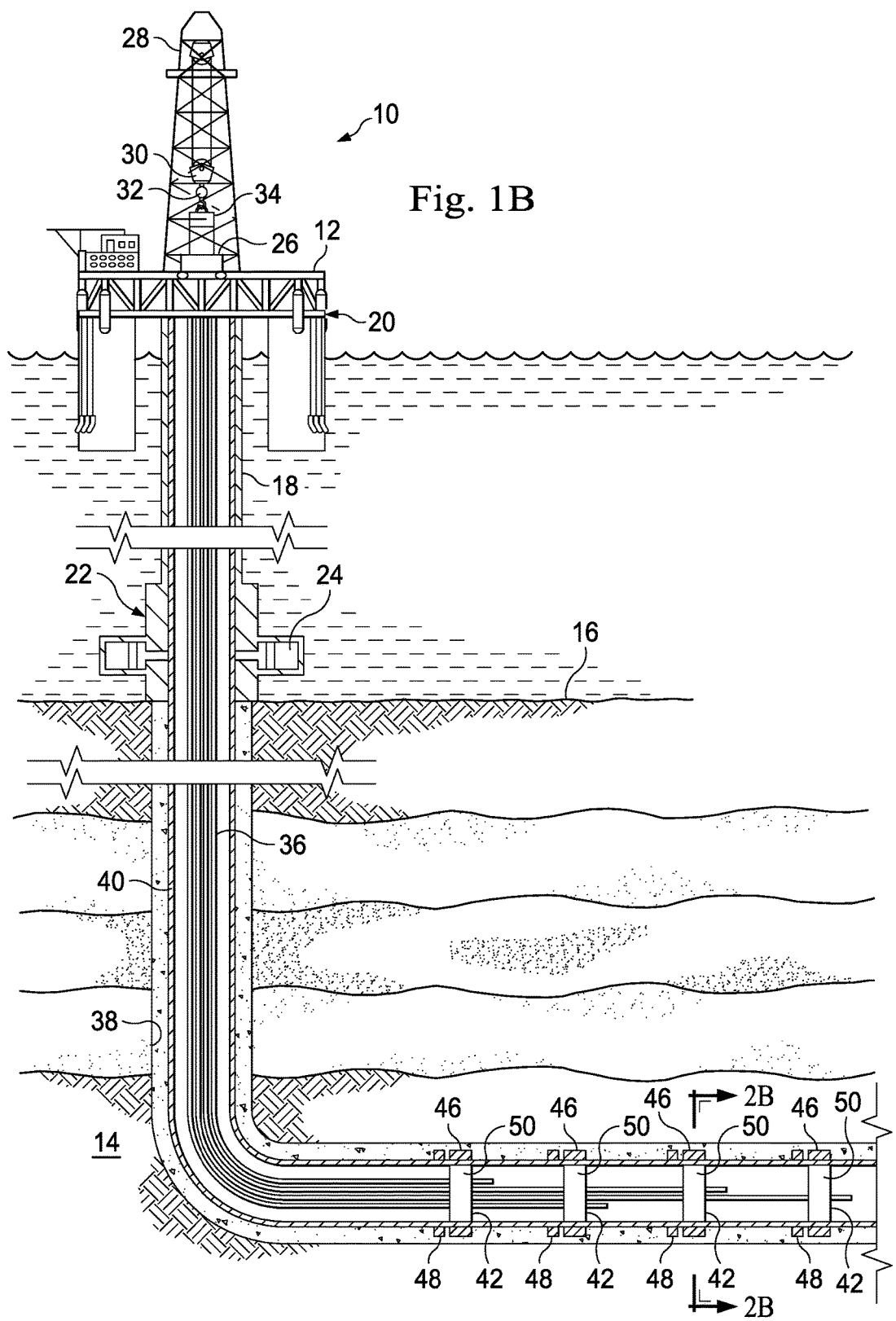
FIG. 1B is a schematic illustration of an offshore oil and gas platform operably coupled to a production packer including a primary circuit and being disposed within a downhole tubular about which a secondary circuit extends, according to an exemplary embodiment.

Referring initially to FIGS. 1A and 1B, an offshore oil and gas platform is schematically illustrated and generally designated by the reference numeral 10. In an exemplary embodiment, the offshore oil and gas platform 10 includes a semi-submersible platform 12 that is positioned over a submerged oil and gas formation 14 located below a sea floor 16. A subsea conduit 18 extends from a deck 20 of the platform 12 to a subsea wellhead installation 22. One or more pressure control devices 24, such as, for example, blowout preventers (BOPs), and/or other equipment associated with drilling or producing a wellbore may be provided at the subsea wellhead installation 22 or elsewhere in the system.

The platform 12 may include a hoisting apparatus 26, a derrick 28, a travel block 30, a hook 32, and a swivel 34, which components are together operable for raising and lowering a conveyance vehicle 36. A variety of conveyance vehicles 36 may be raised and lowered from the platform 12, such as, for example, casing, drill pipe, coiled tubing, production tubing, other types of pipe or tubing strings, and/or other types of conveyance vehicles, such as wireline, slickline, and the like. The platform 12 may also include a kelly, a rotary table, a top drive unit, and/or other equipment associated with the rotation and/or translation of the conveyance vehicle 36. A wellbore 38 extends from the subsea wellhead installation 22 and through the various earth strata, including the formation 14. At least a portion of the wellbore 38 includes a casing string 40 cemented therein.

In an exemplary embodiment, as illustrated in FIG. 1A, a primary circuit 42 is incorporated into a wireline tool 44 that is lowered from the platform 12 into the casing string 40 via the conveyance vehicle 36, which, in this case, takes the form of a wireline conveyance. Additionally, one or more secondary circuits 46 are situated in an annular space defined between the casing string 40 and the wellbore 38. The secondary circuits 46 are adapted to communicate electrically with out-of-casing sensors or electronics incorporated into, for example, one or more sensors 48. In several exemplary embodiments, the secondary circuits 46 and the sensors 48 are embedded in the cement surrounding the casing string 40 in the wellbore 38. The wireline tool 44 is adapted to move along the interior of the casing string 40 to energize each of the secondary circuits 46. Specifically, the respective secondary circuits 46 are adapted to be individually energized by the primary circuit 42, as will be described in further detail below. The secondary circuits 46 communicate electrically with the respective sensors 48, which may be adapted to measure a range of geological characteristics including, but not limited to, the density, porosity, resistivity, and lithology of the various earth strata, including the formation 14, in the vicinity of the wellbore 38. The sensors 48 may perform a variety of measurement operations to determine such geological characteristics, such as, for example, density measurement, gamma ray measurement, resistivity measurement, sonic velocity measurement, another downhole measurement operation, or the like.

In another exemplary embodiment, as illustrated in FIG. 1B, at least one of the primary circuits 42 is incorporated into one or more packers 50, respectively. The packers 50 are then set in the casing string 40 to facilitate the production of hydrocarbons from different zones of the formation 14 via, for example, production tubing 52. The packers 50 are each located interior to the casing string 40 and adjacent a respective one of the secondary circuits 46. As a result, the primary circuits 42 incorporated into the packers 50 are adapted to energize the respective secondary circuits 46.

Figure 2A:
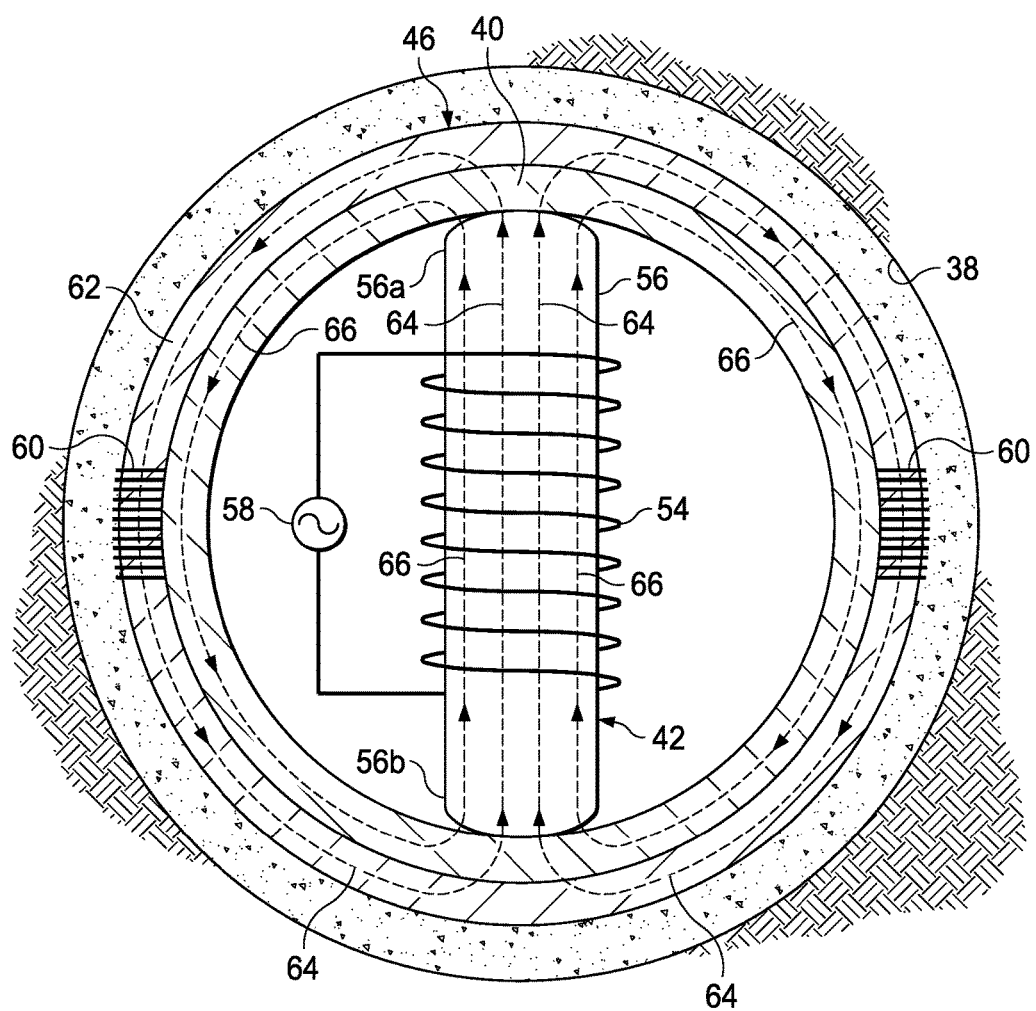
FIG. 2A is a cross-sectional view of a first embodiment of the primary and secondary circuits, taken along the line 2A-2A of FIG. 1A, the primary circuit including a primary winding and a primary core, and the secondary circuit including a secondary winding and a secondary core, according to an exemplary embodiment.
Figure 2B:
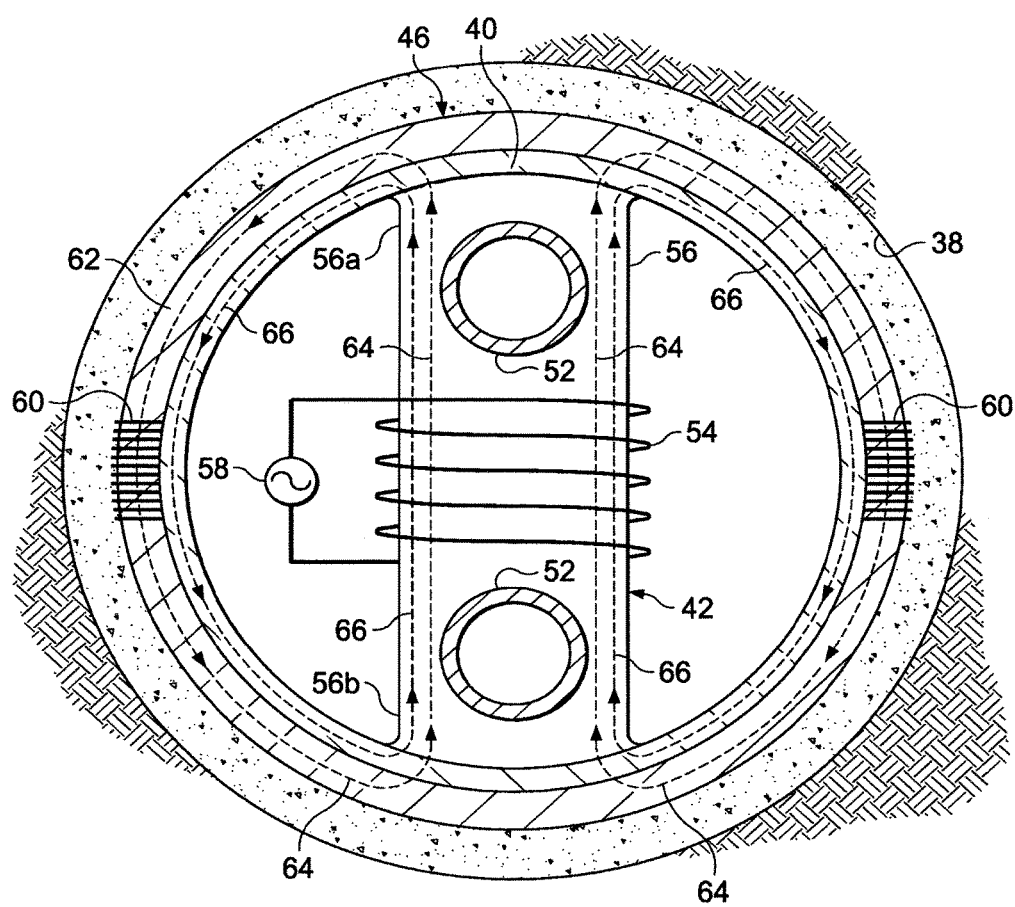
FIG. 2B is a cross-sectional view of the first embodiment of the primary and secondary circuits, taken along the line 2B-2B of FIG. 1B, the primary circuit including a primary winding and a primary core, and the secondary circuit including a secondary winding and a secondary core, according to an exemplary embodiment.

Referring now to FIGS. 2A and 2B, an embodiment of the primary and secondary circuits 42 and 46, respectively, of FIGS. 1A and 1B is illustrated. FIG. 2A is a cross-sectional view taken along the line 2A-2A of FIG. 1A. The wireline tool 44 (not visible in FIG. 2A) extends within the casing string 40 so that the primary circuit 42 is situated interior to a respective one of the secondary circuits 46. FIG. 2B is a cross-sectional view the line 2B-2B of FIG. 1B. The packer 50 (not visible in FIG. 2B) extends within the casing string 40 so that the associated primary circuit 42 is situated interior to a respective one of the secondary circuits 46. The production tubing 52 is shown extending through at least a portion of the primary circuit 42. However, the production tubing 52 may extend through other components of the packer 50 that are not associated with the primary circuit 42. In several exemplary embodiments, the primary circuits 42 shown in FIGS. 2A and 2B are substantially identical to one another and, therefore, any description of the primary circuit 42 hereinbelow applies equally to the embodiments of FIGS. 2A and 2B. Moreover, in several exemplary embodiments, the secondary circuits 46 shown if FIGS. 2A and 2B are substantially identical to one another and, therefore, any description of the secondary circuits 46 hereinbelow applies equally to the embodiments of FIGS. 2A and 2B.

The primary circuit 42 includes a primary winding 54 wrapped around a magnetically permeable primary core 56 and connected to an electrical source 58. The primary core 56 defines opposing end portions 56a and 56b adapted to contact, or nearly contact, the interior of the casing string 40. Although the radial dimensions of the primary core 56 are limited by the diameter of the casing string 40, the axial length of the primary core 56 may be constructed to optimize the amount of power and/or data communicated to the secondary circuit 46. Moreover, although the electrical source 58 is shown schematically and adjacent the primary winding 54 in FIGS. 2A and 2B, the electrical source 58 may in fact be located elsewhere such as, for example, at the surface. As a result, one or more cables (not shown) may be required to connect the primary winding 54 to the electrical source 58.

The secondary circuit 46 includes a secondary winding 60 wrapped around a secondary core 62. The secondary core 62 defines a generally annular body of magnetically permeable material that extends circumferentially about the casing string 40 and within the wellbore 38. In several exemplary embodiments, the secondary core 62 is embedded in the cement surrounding the casing string 40 in the wellbore 38. Although the radial dimensions of the secondary core 62 are limited by the size of the annular space between the casing string 40 and the wellbore 38, the axial length of the secondary core 62 can be constructed to optimize the amount of power and/or data received by the secondary circuit 46 in the wellbore 38. The secondary winding 60 is wrapped helically around the annular body to form a coil over at least a portion of the secondary core 62. In several exemplary embodiments, the secondary winding 60 includes multiple coils formed over respective portions of the secondary core 62.

In operation, with continuing reference to FIGS. 2A and 2B, the primary circuit 42 is incorporated into the wireline tool 44 or, alternatively, into one of the packers 50. The primary circuit 42 is then positioned within the casing string 40 to transfer power and/or data between the primary circuit 42 and the secondary circuit 46. The primary and secondary windings 54 and 60, respectively, along with the primary and secondary cores 56 and 62, respectively, are then used to transfer power and/or data between the interior of the casing string 40 and the exterior thereof, through a process of electromagnetic induction. The process is initiated by providing an electrical current to the primary winding 54 with the electrical source 58. The electrical current flows through the primary winding 54 to create a magnetic field. The magnetic field generated by the electrical current in the primary winding 54 induces a magnetic flux in the primary core 56, as indicated by arrows 64. The magnetic flux prefers to flow through material having a high magnetic permeability. As a result, the magnetic flux generated in the primary core 56 passes through the casing 40 and into the secondary core 62, generally following the magnetic field created by the electrical current in the primary winding 54, as indicated by the arrows 64. In several exemplary embodiments, the primary core 56 of the primary circuit 42 is located as close as is practicable to the interior of the casing string 40 to optimize, or at least reduce, the magnetic reluctance between the primary and secondary circuits 42 and 46, respectively. As a result, the strength of the magnetic coupling between the primary winding 54 and the secondary winding 60 is improved.

The magnetic flux flowing through the secondary core 62 induces an electromotive force (EMF) or voltage in the secondary winding 60. The voltage in the secondary winding 60 may then be used to communicate electrically with a variety of out-of-casing sensors or electronics such as, for example, the sensors 48 (visible in FIGS. 1A and 1B). In several exemplary embodiments, the voltage produced in the secondary winding 60 is used to communicate electrically with devices such as electromagnetic transmitters, acoustic transmitters, or other types of devices used for out-of-casing evaluation of the formation 14. In several exemplary embodiments, the voltage produced in the secondary winding 60 is used to communicate electrically with sensors for monitoring cement or casing integrity. In several exemplary embodiments, the voltage produced in the secondary winding 60 is used to communicate electrically with sensors for monitoring injection fluids used for production stimulation operations.

At least a portion of the magnetic flux in the primary core 56 may flow through the casing string 40, as indicated by arrows 66, especially if the casing string 40 is made of a material with sufficiently high magnetic permeability. The magnetic flux in the casing string 40 generates heat and causes efficiency losses during the transfer of power and/or data between the primary winding 54 and the secondary winding 60. Accordingly, in several exemplary embodiments, respective portions of the casing string 40 located interior and adjacent the secondary circuits 46 are constructed from material with low magnetic permeability. The portions constructed from the material with low magnetic permeability are incorporated into the casing string 40 prior to the installation of the casing string 40 into the wellbore 38. Moreover, the secondary circuits 46 are positioned exterior to the portions of the casing string 40 having low magnetic permeability. In several exemplary embodiments, the incorporation of the low magnetic permeability portions into the casing string 40 prevents, or at least reduces, the flow of magnetic flux in the casing string 40. Thus, in operation, the magnetic flux generated by the electrical current in the primary winding 54 passes directly through the casing string 40 and into the secondary core 62, as indicated by the arrows 64. In this manner, the portions of the casing string 40 having low magnetic permeability decrease efficiency losses during the transfer of power and/or data between the primary winding 54 and the secondary winding 60.

Figure 3:
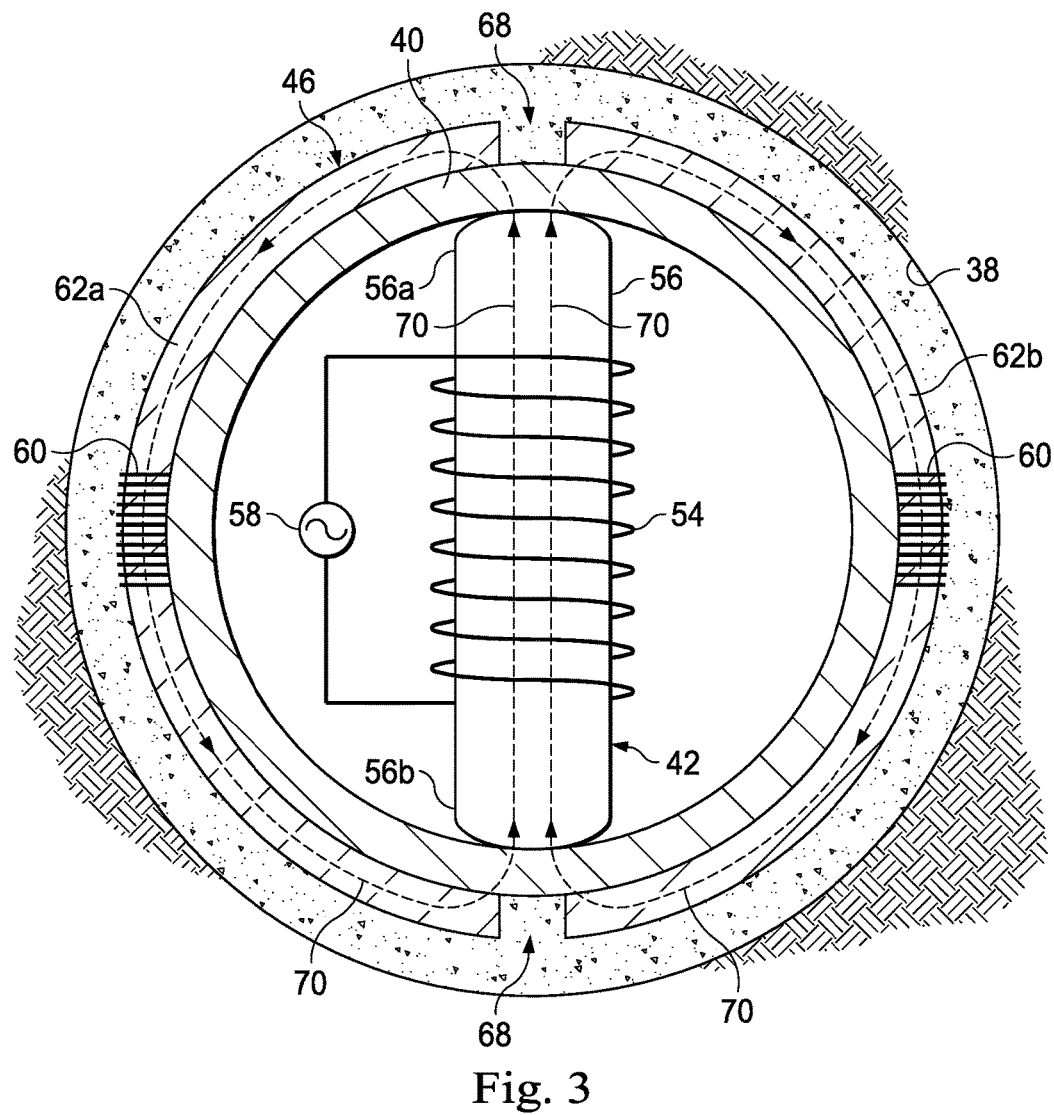
FIG. 3 is a cross-sectional view similar to the views illustrated in FIGS. 2A and 2B, except that the secondary core is split longitudinally into a pair of core sections separated by a corresponding pair of gaps, according to an exemplary embodiment.

Referring to FIG. 3, with continuing reference to FIGS. 2A and 2B, another embodiment of the secondary circuit 46 is illustrated, in which the secondary core 62 is split longitudinally into a pair of core sections 62a and 62b. A pair of gaps 68 are defined between respective adjacent end portions of the core sections 62a and 62b. When the end portions 56a and 56b of the primary core 56 are properly aligned with the gaps 68, the magnetic flux generated by the electrical current in the primary winding 54 passes through the casing string 40 and into the respective core sections 62a and 62b of the secondary core 62, as indicated by arrows 70. However, if the end portions 56a and 56b of the primary core 56 are not properly aligned with the gaps 68, the flow of magnetic flux through the secondary core is interrupted by the gaps 68, thus preventing the induction of an electromotive force (EMF) or voltage in the secondary winding 60. Thus, to transfer power and/or data between the interior of the casing string 40 and the exterior thereof via the primary and secondary circuits 42 and 46, respectively, the end portions 56a and 56b of the primary core 56 must be properly aligned with the gaps 68.

Figure 4:
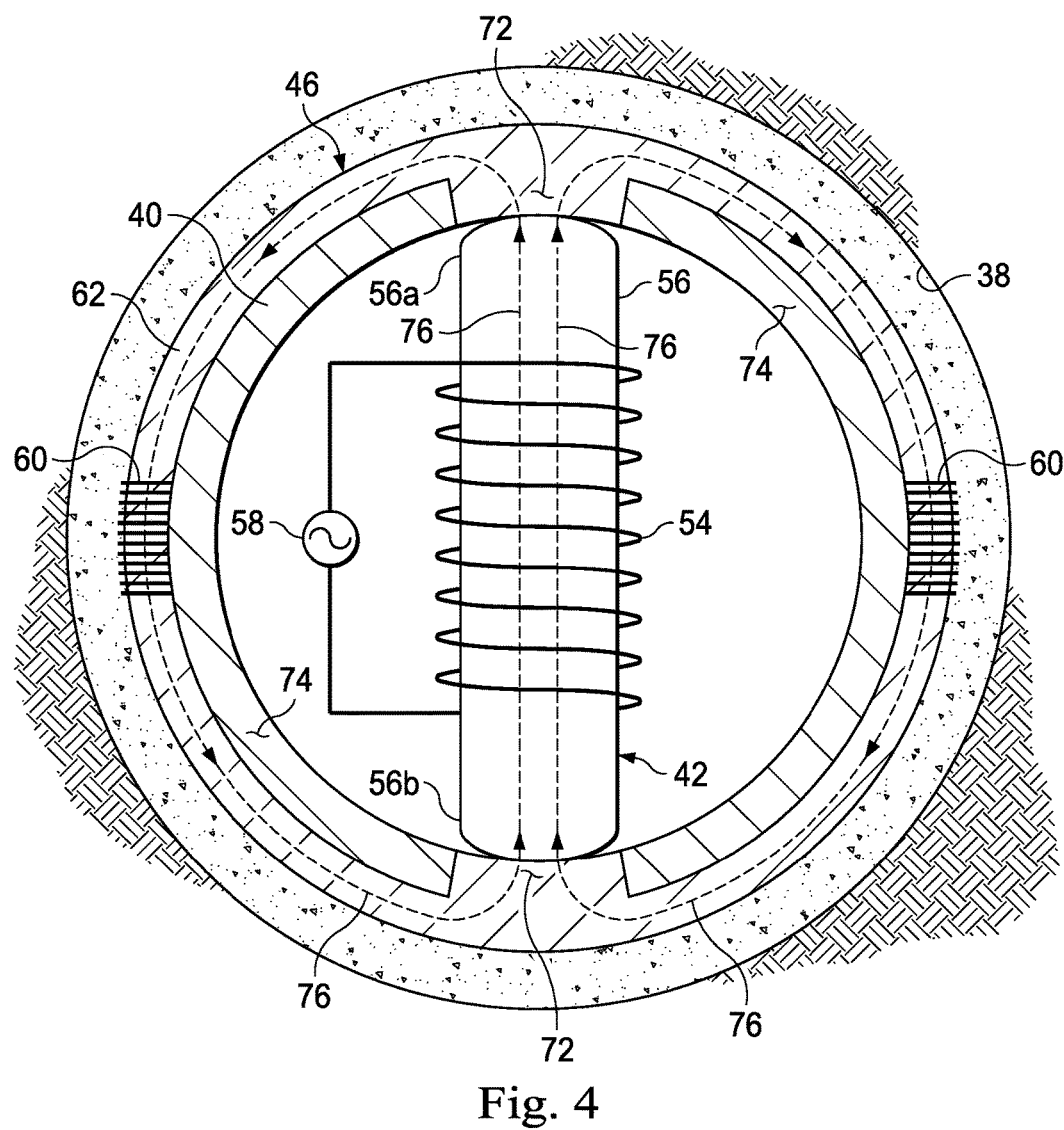
FIG. 4 is a cross-sectional view of the primary and secondary circuits similar to the views illustrated in FIGS. 2A and 2B, except that zones of high magnetic permeability are formed in the downhole tubular between the primary and secondary cores, according to an exemplary embodiment.

Referring to FIG. 4, with continuing reference to FIGS. 2A, 2B, and 3, an embodiment is illustrated in which a portion (or multiple portions) of the casing string 40 (located interior and adjacent one (or respective ones) of the secondary circuits 46) is constructed to include zones of differing magnetic permeability. Specifically, the portion of the casing string 40 is made of, for example, nonmagnetic steel (having a relative magnetic permeability of ~1) that is machined to introduce regions of high magnetic permeability at positions where the end portions 56a and 56b of the primary core 56 contact, or nearly contact, the interior of the casing string 40. As a result, a pair of longitudinally extending high permeability zones 72 are formed in the one or more portions of the casing string 40 located interior and adjacent the secondary circuit 46. A corresponding pair of low permeability zones 74 are interposed circumferentially between the high permeability zones 72 so that the high permeability zones 72 are disposed radially opposite one another. The high and low permeability zones 72 and 74, respectively, are incorporated into the casing string 40 prior to the installation of the casing string 40 into the wellbore 38. The secondary circuit 46 is positioned around the casing string 40 at the location of the high and low permeability zones 72 and 74, respectively, so that the secondary core 62 is aligned with the high permeability zones 72. In several exemplary embodiments, the high permeability zones 72 are part of the secondary core 62.

In several exemplary embodiments, the respective end portions 56a and 56b of the primary core 56 are similar in size to the high permeability zones 72 of the casing string 40. The end portions 56a and 56b of the primary core 56 are thus adapted to contact, or nearly contact, the high permeability zones 72. As a result, in operation, the magnetic flux generated by the electrical current in the primary winding 54 passes through the high permeability zones 72 and into the secondary core 62, as indicated by arrows 76. In contrast, the magnetic flux does not pass through the low permeability zones 74. Thus, the high permeability zones 72 are used to channel the magnetic flux from the primary core 56 into the secondary core 62 to induce an electromotive force (EMF) or voltage in the secondary winding 60. In this manner, the high permeability zones 72 act to reduce efficiency losses during the transfer of power and/or data between the primary winding 54 and the secondary winding 60.

Figure 5A:
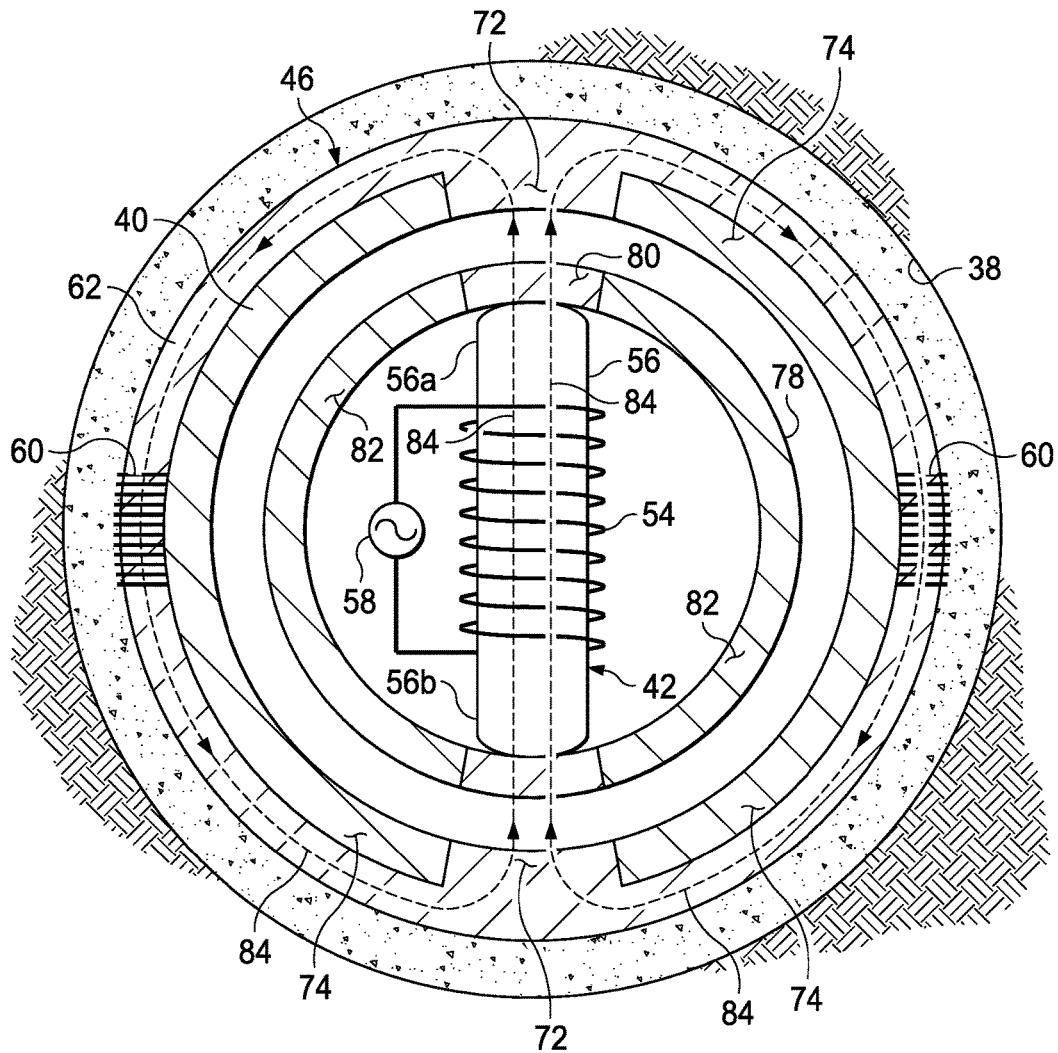
FIG. 5A is a cross-sectional view of the primary and secondary circuits similar to the view illustrated in FIG. 4, except that a second downhole tubular having zones of high magnetic permeability extends inside the downhole tubular and radially between the primary and secondary circuits, according to an exemplary embodiment.
Figure 5B:
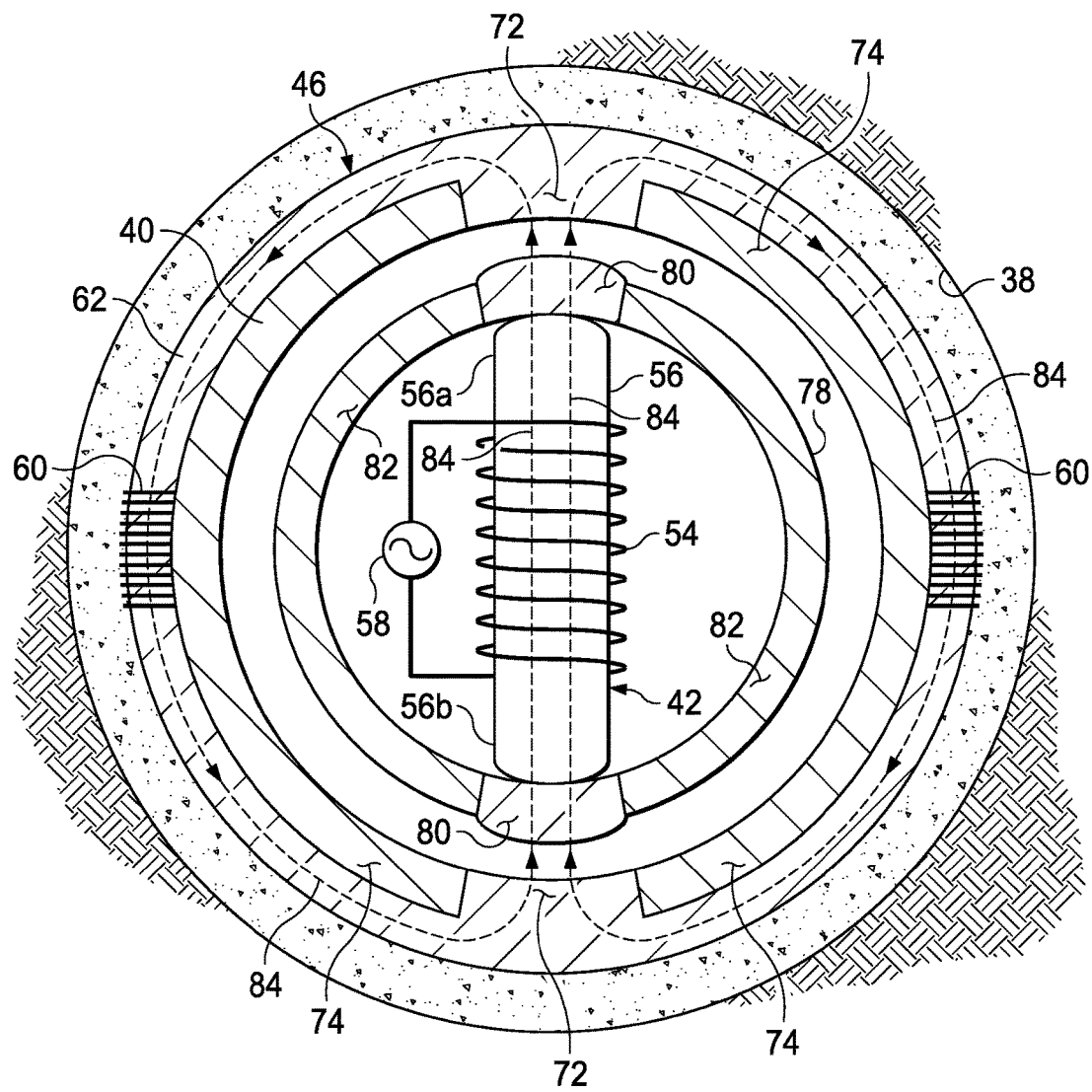
FIG. 5B is a cross-sectional view of the primary and secondary circuits similar to the view illustrated in FIG. 5A, except that the radial thickness of the zones of high magnetic permeability in the second downhole tubular are increased, according to an exemplary embodiment.

Referring to FIGS. 5A and 5B, with continuing reference to FIG. 4, an embodiment is illustrated in which a tubing string 78 extends radially between the primary and secondary circuits 42 and 46, respectively. The tubing string 78 extends inside the casing string 40 so that an annular space is defined between the exterior of the tubing string 78 and the interior of the casing string 40. In an exemplary embodiment, a portion (or multiple portions) of the tubing string 78 (located interior and adjacent one (or respective ones) of the secondary circuits 46) is constructed to include zones of differing magnetic permeability. Specifically, the portion of the tubing string 78 is made of, for example, nonmagnetic steel (having a relative magnetic permeability of ~1) that is machined to introduce regions of high magnetic permeability at positions where the primary core 56 contacts, or nearly contacts, the interior of the tubing string 78. As a result, a pair of longitudinally extending high permeability zones 80 are formed in the one or more portions of the tubing string 78 located interior and adjacent the secondary circuit 46. A corresponding pair of low permeability zones 82 are interposed circumferentially between the high permeability zones 80 so that the high permeability zones 80 are disposed radially opposite one another. The high and low permeability zones 80 and 82, respectively, are incorporated into the tubing string 78 prior to the installation of the tubing string 78 into the casing string 40. The secondary circuit 46 is positioned around the casing string 40 at the location of high and low permeability zones 72 and 74, respectively, of the casing string 40. Moreover, the respective high and low permeability zones 80 and 82 of the tubing string 78 are positioned interior to, and aligned with, the respective high and low permeability zones 72 and 74, of the casing string 40.

In several exemplary embodiments, the high permeability zones 80 of the tubing string 78 are similar in size to the end portions 56a and 56b of the primary core 56. The end portions 56a and 56b of the primary core 56 are thus adapted to contact, or nearly contact, the high permeability zones 80. Moreover, in several exemplary embodiments, the high permeability zones 80 of the tubing string 78 are similar in size to the respective high permeability zones 72 of the casing string 40. The high permeability zones 80 of the tubing string 78 are thus adapted to contact, or nearly contact, the high permeability zones 72 of the casing string 40. As a result, in operation, the magnetic flux generated by the electrical current in the primary winding 54 passes through the respective high permeability zones 72 and 80 of the casing string 40 and the tubing string 78, as indicated by arrows 84. In contrast, the magnetic flux does not pass through the respective low permeability zones 74 and 82 of the casing string 40 and the tubing string 78. Thus, the high permeability zones 72 and 80 are used to channel the magnetic flux from the primary core 56 into the secondary core 62 to induce an electromotive force (EMF) or voltage in the secondary winding 60. In this manner, the high permeability zones 72 and 80 act to reduce efficiency losses during the transfer of power and/or data between the primary winding 54 and the secondary winding 60.

As shown in FIG. 5B, the radial thickness of the high permeability zones 80 may be adjusted to create closer proximity between the respective high permeability zones 72 and 80 of the casing string 40 and the tubing string 78. Increased proximity between the high permeability zones 72 and 80 optimizes, or at least reduces, the magnetic reluctance between the primary and secondary circuits 42 and 46, respectively. Moreover, in several exemplary embodiments, the primary core 56 of the primary circuit 42 is located as close as is practicable to the interior of the tubing string 78 to optimize, or at least reduce, the magnetic reluctance between the primary and secondary circuits 42 and 46, respectively. As a result, the strength of the magnetic coupling between the primary winding 54 and the secondary winding 60 is improved.

Figure 6A:
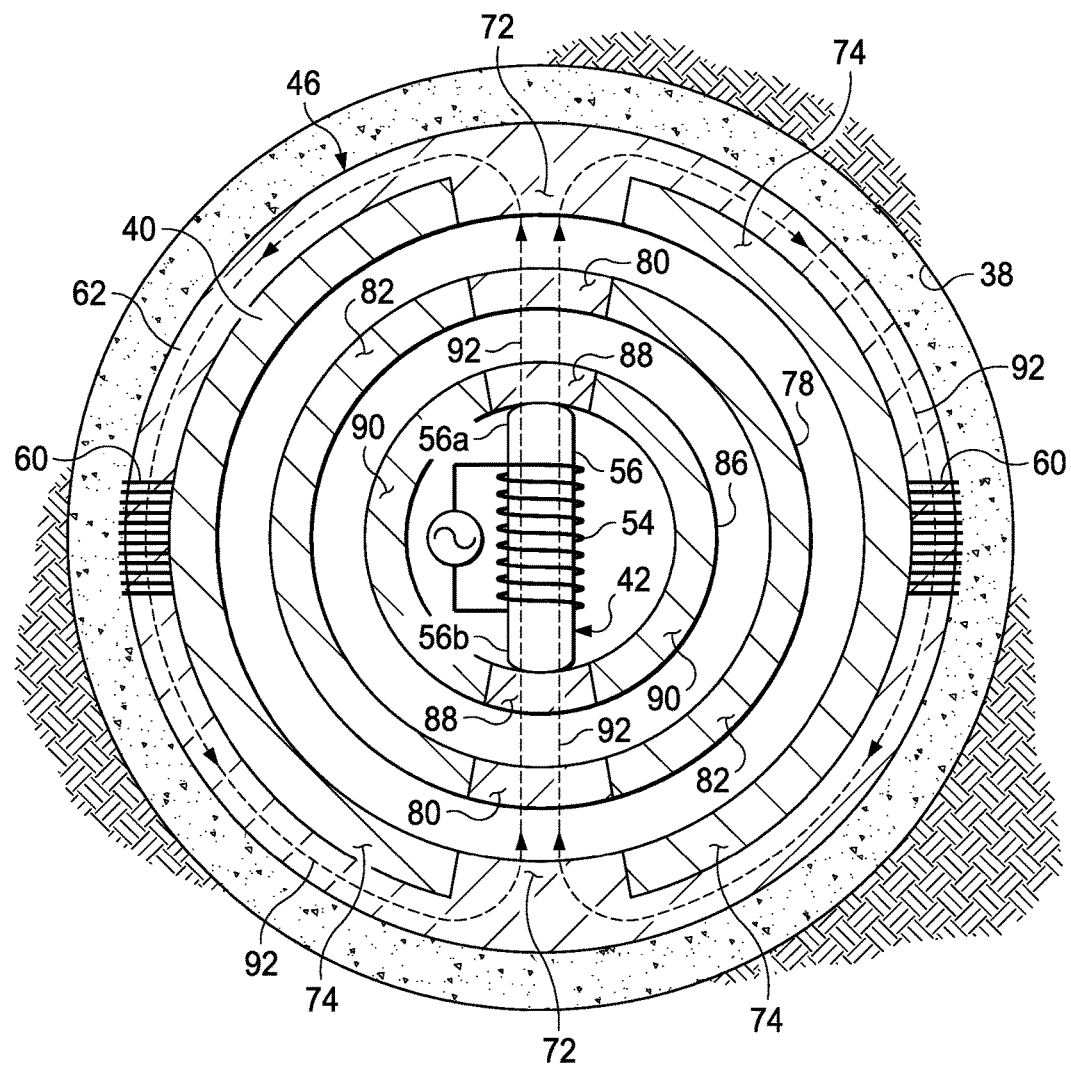
FIG. 6A is a cross-sectional view of the primary and secondary circuits of FIG. 5A, except that a third downhole tubular having zones of high magnetic permeability extends inside the second downhole tubular and radially between the primary and secondary circuits, according to an exemplary embodiment.
Figure 6B:
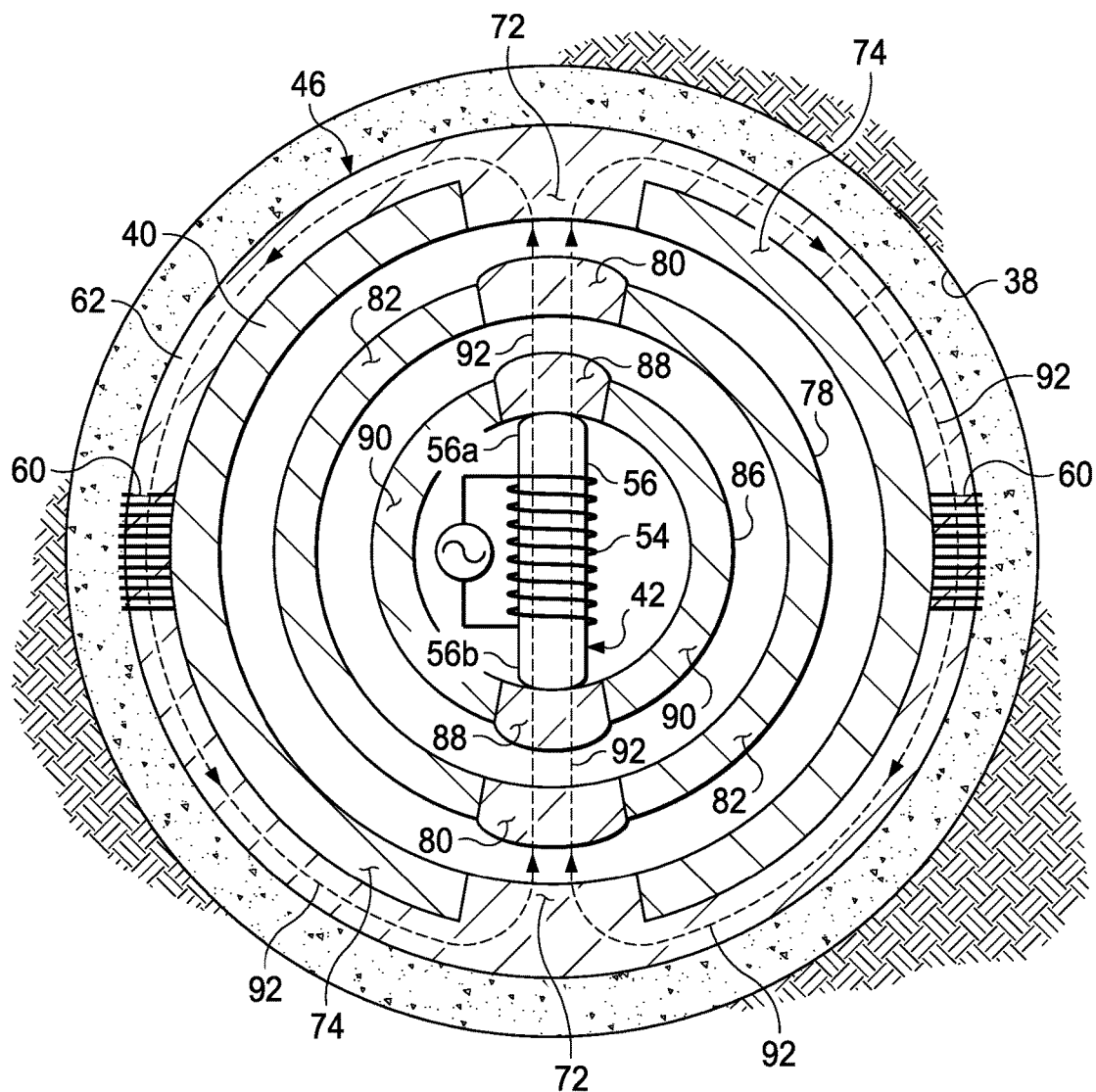
FIG. 6B is a cross-sectional view of the primary and secondary circuits of FIG. 6A, except that the radial thicknesses of the zones of high magnetic permeability in the first and third downhole tubulars are increased, according to an exemplary embodiment.

Referring to FIGS. 6A and 6B, with continuing reference to FIGS. 5A and 5B, an embodiment is illustrated in which a tubing string 86 extends radially between the primary and secondary circuits 42 and 46, respectively. The tubing string 86 extends inside the tubing string 78 so that an annular space is defined between the exterior of the tubing string 86 and the interior of the tubing string 78. In an exemplary embodiment, a portion (or multiple portions) of the tubing string 86 (located interior and adjacent one (or respective ones) of the secondary circuits 46) is constructed to include zones of differing magnetic permeability. Specifically, the portion of the tubing string 86 is made of, for example, nonmagnetic steel (having a relative magnetic permeability of ~1) that is machined to introduce regions of high magnetic permeability at positions where the primary core 56 contacts, or nearly contacts, the interior of the tubing string 86. As a result, a pair of longitudinally extending high permeability zones 88 are formed in the portion of the tubing string 86 located interior and adjacent the secondary circuit 46. A corresponding pair of low permeability zones 90 are interposed circumferentially between the high permeability zones 88 so that the high permeability zones 88 are disposed radially opposite one another. The high and low permeability zones 88 and 90, respectively, are incorporated into the tubing string 86 prior to the installation of the tubing string 86 into the tubing string 78. The secondary circuit 46 is positioned around the casing string 40 at the location of high and low permeability zones 72 and 74, respectively, of the casing string 40. Further, the high and low permeability zones 80 and 82 of the tubing string 78 are positioned interior to, and aligned with, the respective high and low permeability zones 72 and 74, of the casing string 40. Further still, the high and low permeability zones 88 and 90 of the tubing string 86 are positioned interior to, and aligned with, the respective high and low permeability zones 80 and 82 of the tubing string 78.

In several exemplary embodiments, the high permeability zones 88 of the tubing string 86 are similar in size to the end portions 56a and 56b of the primary core 56. The end portions 56a and 56b of the primary core 56 are thus adapted to contact, or nearly contact, the high permeability zones 88. Further, in several exemplary embodiments, the high permeability zones 88 of the tubing string 86 are similar in size to the respective high permeability zones 80 of the tubing string 78. The high permeability zones 88 of the tubing string 86 are thus adapted to contact, or nearly contact, the high permeability zones 80 of the tubing string 78. Further still, in several exemplary embodiments, the high permeability zones 80 of the tubing string 78 are similar in size to the respective high permeability zones 72 of the casing string 40. The high permeability zones 80 of the tubing string 78 are thus adapted to contact, or nearly contact, the high permeability zones 72 of the casing string 40. As a result, in operation, the magnetic flux generated by the electrical current in the primary winding 54 passes through the respective high permeability zones 72, 80, and 88 of the casing string 40, the tubing string 78, and the tubing string 86, as indicated by arrows 92. In contrast, the magnetic flux does not pass through the respective low permeability zones 74, 82, and 90 of the casing string 40, the tubing string 78, and the tubing string 86. Thus, the high permeability zones 72, 80, and 88 are used to channel the magnetic flux from the primary core 56 into the secondary core 62, as indicated by the arrows 92, to induce an electromotive force (EMF) or voltage in the secondary winding 60. In this manner, the high permeability zones 72, 80 and 88 act to reduce efficiency losses during the transfer of power and/or data between the primary winding 54 and the secondary winding 60.

As shown in FIG. 6B, the radial thickness of the high permeability zones 80 may be adjusted to create closer proximity between the high permeability zones 72 and 80, respectively, of the casing string 40 and the tubing string 78. Increased proximity between the high permeability zones 72 and 80 optimizes, or at least reduces, the magnetic reluctance between the primary and secondary circuits 42 and 46, respectively. Further, in several exemplary embodiments, the radial thickness of the high permeability zones 88 may be adjusted to create closer proximity between the respective high permeability zones 80 and 88 of the tubing strings 78 and 86. Increased proximity between the high permeability zones 80 and 88 optimizes, or at least reduces, the magnetic reluctance between the primary and secondary circuits 42 and 46, respectively. Further still, in several exemplary embodiments, the primary core 56 of the primary circuit 42 is located as close as is practicable to the interior of the tubing string 78 to optimize, or at least reduce, the magnetic reluctance between the primary and secondary circuits 42 and 46, respectively. As a result, the strength of the magnetic coupling between the primary winding 54 and the secondary winding 60 is improved.

Figure 7A:
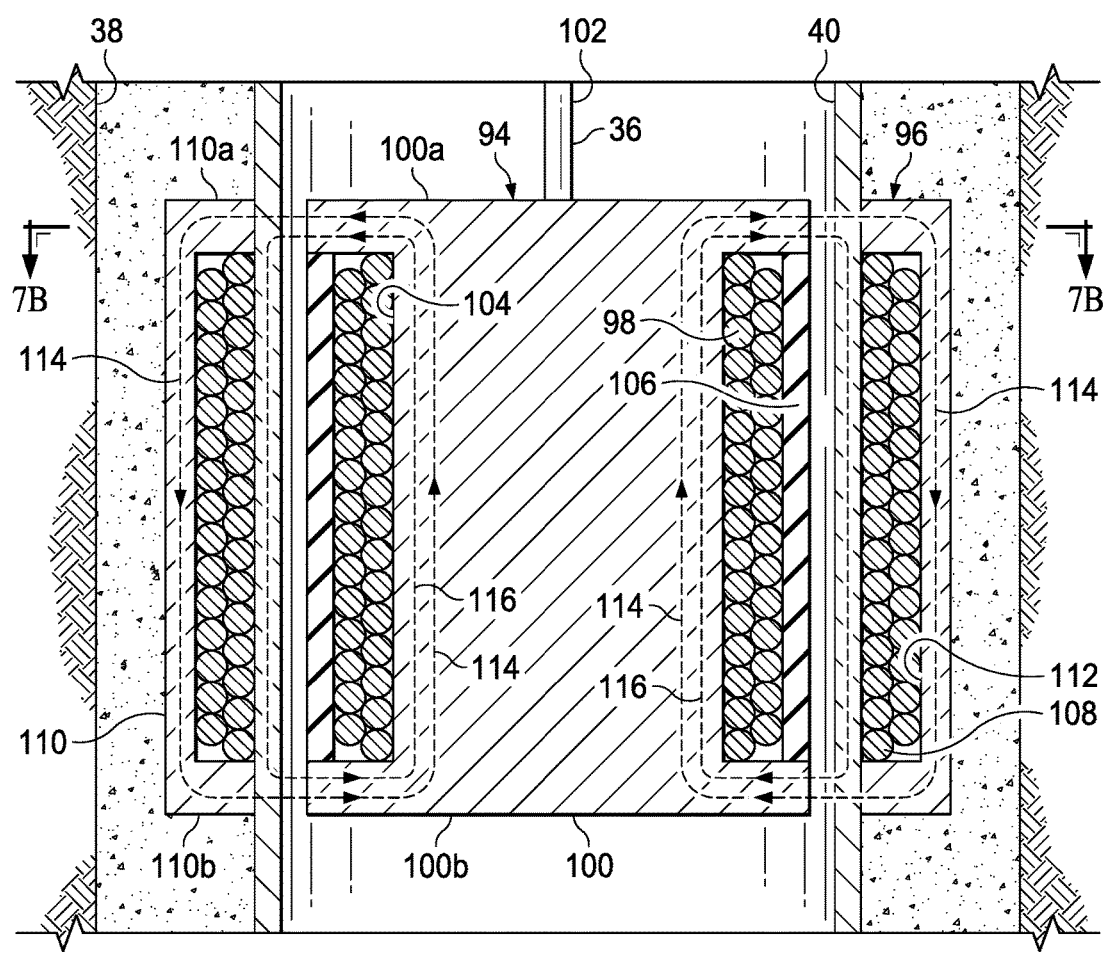
FIG. 7A is a cross-sectional elevational view of a second embodiment of the primary and secondary circuits of FIGS. 1A and 1B, the primary circuit including a primary winding and a primary core, and the secondary circuit including a secondary winding and a secondary core, according to an exemplary embodiment.
Figure 7B:
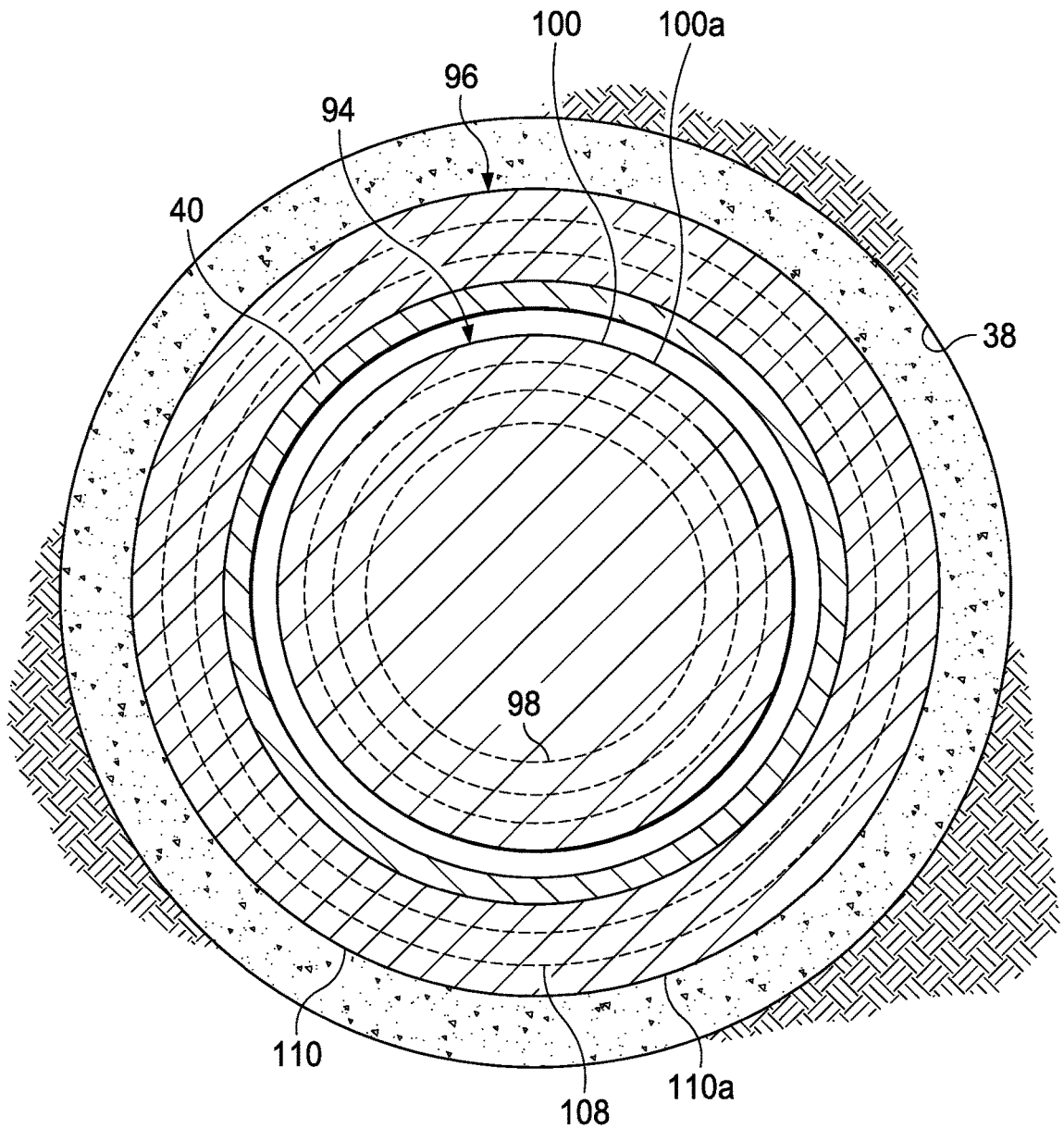
FIG. 7B is a cross-sectional view of the second embodiment of the primary and secondary circuits, taken along the line 7B-7B of FIG. 7A, according to an exemplary embodiment.

Referring now to FIGS. 7A and 7B, an additional embodiment of the primary and secondary circuits 42 and 46, respectively, is illustrated, in which the primary circuit is generally referred to by the reference numeral 94 and the secondary circuit is generally referred to by the reference numeral 96. The primary circuit 94 includes a primary winding 98 wrapped around a magnetically permeable primary core 100 and connected to an electrical source (not visible in FIGS. 7A and 7B) via a cable 102 incorporated into the conveyance vehicle 36. The primary core 100 defines opposing end portions 100a and 100b. The radial extents of the end portions 100a and 100b are adapted to contact, or nearly contact, the interior of the casing string 40. An external annular recess 104 is formed in the exterior of the primary core 100 between the end portions 100a and 100b thereof. The primary winding 98 extends within the external annular recess 104 and is wrapped helically around the primary core 100 to form a coil over at least a portion thereof. In several exemplary embodiments, a jacket portion 106 covers the primary winding 98 so as to contain the primary winding 98 within the external annular recess 104. Although the radial dimensions of the primary core 100 are limited by the diameter of the casing string 40, the axial length of the primary core 100 may be constructed to optimize the amount of power and/or data communicated to the secondary circuit 96. Moreover, the electrical source (not visible in FIGS. 7A and 7B) may be located, for example, adjacent the primary winding 98, at the surface of the well, or elsewhere in the system. The length and configuration of the cable 102 may vary accordingly, as required by the particular location of the electrical source. As shown in FIG. 7B, which is a cross-sectional view taken along the line 7B-7B of FIG. 7A, the end portions 100a and 100b of the primary core 100 each define a generally cylindrical profile (the end portion 100b is not visible in FIG. 7B). Alternatively, in several exemplary embodiments, the end portions 100a and 100b of the primary core 100 may each define a generally cross-shaped profile, as will be discussed in further detail below.

The secondary circuit 96 includes a secondary winding 108 and a secondary core 110. The secondary core 110 defines a generally annular body of magnetically permeable material that extends circumferentially about the casing string 40 and within the wellbore 38. In several exemplary embodiments, the secondary core 110 is embedded in the cement surrounding the casing string 40 in the wellbore 38. The secondary core 110 defines opposing end portions 110a and 110b which are adapted to magnetically couple to the end portions 100a and 100b, respectively, of the primary core 100. An internal annular recess 112 is formed in the interior of the secondary core 110, between the end portions 110a and 110b thereof. The secondary winding 108 extends within the internal annular recess 112 and helically around the casing string 40 to form a coil within at least a portion of the secondary core 110. In several exemplary embodiments, the casing string 40 covers the secondary winding 108 so that the secondary winding 108 is contained within the internal annular recess 112. Although the radial dimensions of the secondary core 110 are limited by the size of the annular space between the casing string 40 and the wellbore 38, the axial length of the secondary core 110 can be constructed to optimize the amount of power and/or data received by the secondary circuit 96 in the wellbore 38.

In operation, with continuing reference to FIGS. 7A and 7B, the primary circuit 94 is positioned within the casing string 40 to transfer power and/or data to the secondary circuit 96. More particularly, the primary winding 98, the primary core 100, the secondary winding 108, and the secondary core 110 are used to transfer power and/or data between the interior of the casing string 40 and the exterior thereof, through a process of electromagnetic induction. The process is initiated by providing an electrical current to the primary winding 98 via the cable 102. The electrical current flows through the primary winding 98 to create a magnetic field. The magnetic field generated by the electrical current in the primary winding 98 induces a magnetic flux in the primary core 100, as indicated by arrows 114. The magnetic flux prefers to flow through material having a high magnetic permeability. As a result, the magnetic flux generated in the primary core 100 passes through the casing 40 and into the secondary core 110, generally following the magnetic field created by the electrical current in the primary winding 98, as indicated by the arrows 114. In several exemplary embodiments, the primary core 100 is located as close as is practicable to the interior of the casing string 40 to optimize, or at least reduce, the magnetic reluctance between the primary and secondary circuits 94 and 96, respectively. As a result, the strength of the magnetic coupling between the primary winding 98 and the secondary winding 108 is improved.

The magnetic flux flowing through the secondary core 110 induces an electromotive force (EMF) or voltage in the secondary winding 108. The voltage in the secondary winding 108 may then be used to communicate electrically with a variety of out-of-casing sensors or electronics such as, for example, the sensors 48 (visible in FIGS. 1A and 1B). At least a portion of the magnetic flux in the primary core 100 may flow through the casing string 40, as indicated by arrows 116, especially if the casing string 40 is made of a material with sufficiently high magnetic permeability. The magnetic flux in the casing string 40 generates heat and causes efficiency losses during the transfer of power and/or data between the primary winding 98 and the secondary winding 108. Accordingly, in several exemplary embodiments, respective portions of the casing string 40 located interior and adjacent the secondary circuits 96 are constructed from material with low magnetic permeability. The portions constructed from the material with low magnetic permeability are incorporated into the casing string 40 prior to the installation of the casing string 40 into the wellbore 38. Moreover, the secondary circuits 96 are positioned exterior to the portions of the casing string 40 having low magnetic permeability. As a result, the portions of the casing string 40 having low magnetic permeability are positioned directly beneath the secondary winding 108. In several exemplary embodiments, the incorporation of the low magnetic permeability portions into the casing string 40 prevents, or at least reduces, the flow of magnetic flux within the casing string 40. Thus, in operation, the magnetic flux generated by the electrical current in the primary winding 98 passes directly through the casing string 40 and into the secondary core 110, as indicated by the arrows 114. In this manner, the portions of the casing string 40 having low magnetic permeability decrease efficiency losses during the transfer of power and/or data between the primary winding 98 and the secondary winding 108.

Figure 8A:
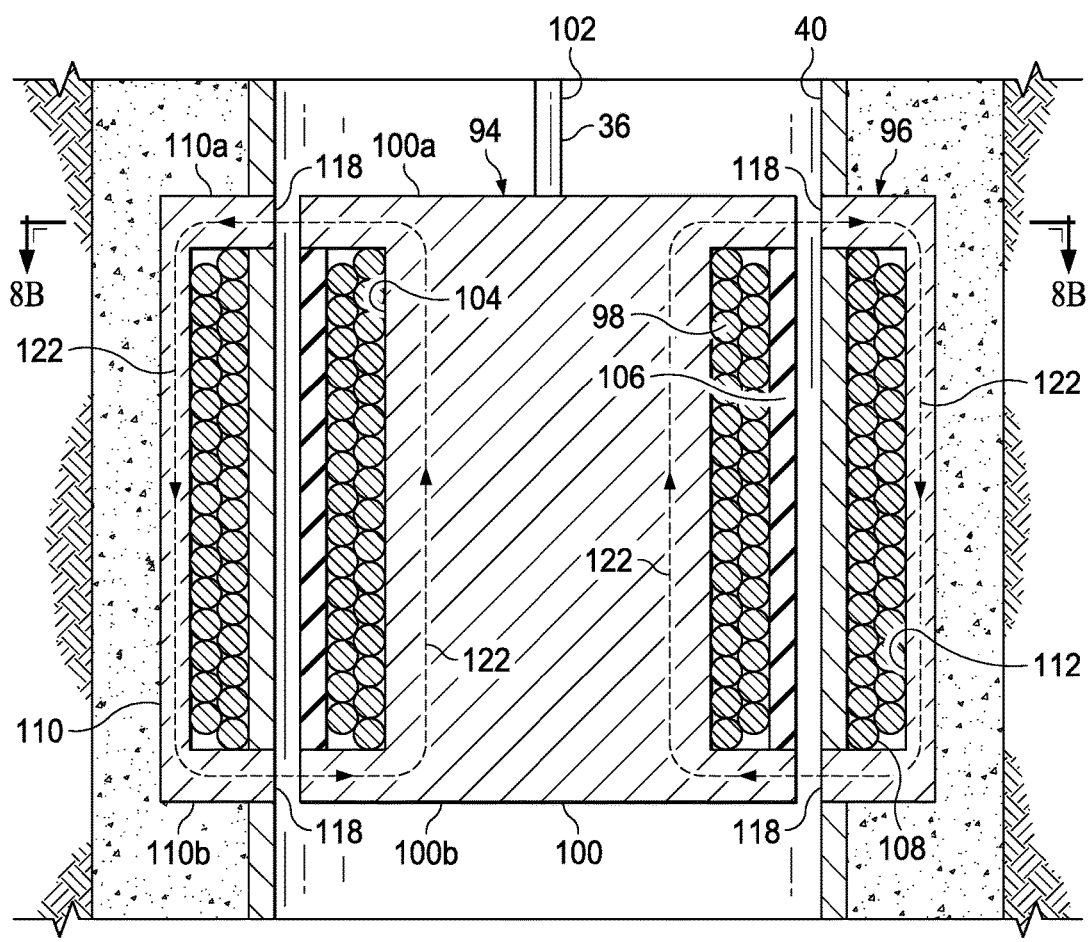
FIG. 8A is a cross-sectional elevational view of the primary and secondary circuits similar to the view illustrated in FIG. 7A, except that zones of high magnetic permeability are formed in the downhole tubular between the primary and secondary cores, according to an exemplary embodiment.
Figure 8B:
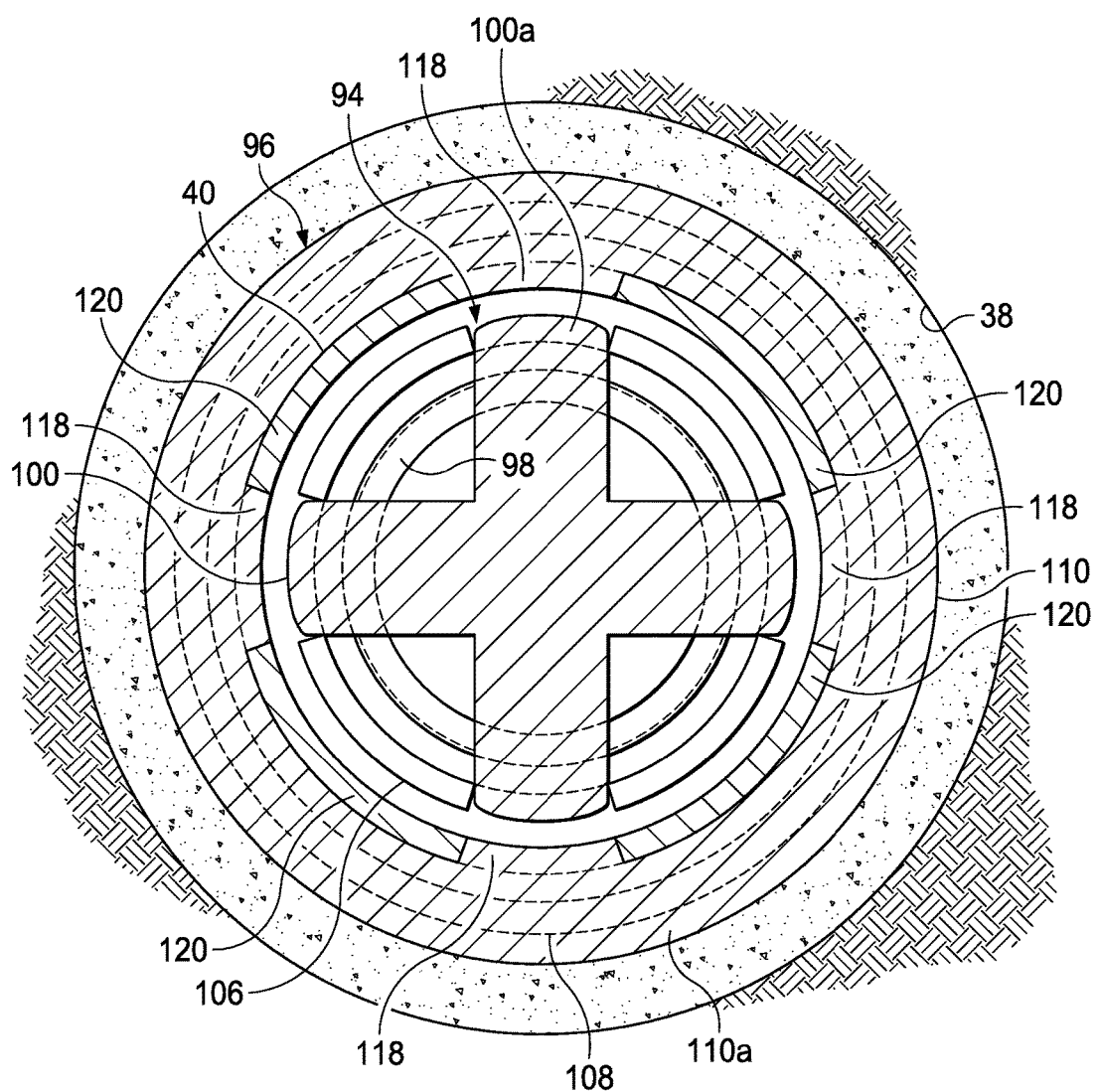
FIG. 8B is a cross-sectional view of the primary and secondary circuits similar to the view illustrated in FIG. 7B and taken along the line 8B-8B of FIG. 8A, except that the primary core has a generally cross-shaped profile, according to an exemplary embodiment.

Referring to FIGS. 8A and 8B, with continuing reference to FIGS. 7A and 7B, an embodiment is illustrated in which a portion (or multiple portions) of the casing string 40 (located interior and adjacent one (or respective ones) of the secondary circuits 96) is constructed to include zones of differing magnetic permeability. Specifically, the portion of the casing string 40 is made of, for example, nonmagnetic steel (having a relative magnetic permeability of ~1) that is machined to introduce regions of high magnetic permeability at positions where the radial extents of the end portions 100a and 100b of the primary core 100 contact, or nearly contact, the interior of the casing string 40. As a result, multiple high permeability zones 118 are formed in the portion of the casing string 40 located interior and adjacent the secondary circuit 96. Moreover, as shown in FIG. 8B, multiple corresponding low permeability zones 120 are interposed circumferentially between the high permeability zones 118 so that the high permeability zones 118 are disposed radially opposite one another. The high and low permeability zones 118 and 120, respectively, are incorporated into the casing string 40 prior to the installation of the casing string 40 into the wellbore 38. The secondary circuit 96 is positioned around the casing string 40 at the location of the high and low permeability zones 118 and 120, respectively, so that the end portions 110a and 110b of the secondary core 110 are aligned with the high permeability zones 118 of the casing string 40. In several exemplary embodiments, the high permeability zones 118 are part of the secondary core 110.

In several exemplary embodiments, the respective end portions 100a and 100b of the primary core 100 are similar in size to the high permeability zones 118 of the casing string 40. The radial extents of the end portions 100a and 100b are thus adapted to contact, or nearly contact, the high permeability zones 118. As shown in FIG. 8B, in several exemplary embodiments, the end portions 100a and 100b of the primary core 100 each define a generally cross-shaped profile (the end portion 100b is not visible in FIG. 8B). The cross-shaped profiles of the end portions 100a and 100b direct the flow of magnetic flux between the primary core 100 and the high permeability zones 118 of the casing string 40. In several exemplary embodiments, the size of the end portions 100a and 100b and/or the size of the high permeability zones 118 may be adjusted to permit varying amounts of misalignment therebetween.

In operation, with continuing reference to FIGS. 8A and 8B, the magnetic flux generated by the electrical current in the primary winding 98 passes through the high permeability zones 118 and into the secondary core 110, as indicated by arrows 122. In contrast, the magnetic flux does not pass through the low permeability zones 120. Thus, the high permeability zones 118 are used to channel the magnetic flux from the primary core 100 into the secondary core 110 to induce an electromotive force (EMF) or voltage in the secondary winding 108. In this manner, the high permeability zones 118 act to reduce efficiency losses during the transfer of power and/or data between the primary winding 98 and the secondary winding 108. However, any misalignment between the radial extents of the end portions 100a and 100b and the high permeability zones 118 of the casing string 40 will prevent, or at least reduce, the induction of an electromotive force (EMF) or voltage in the secondary winding 108. Thus, to transfer power and/or data between the interior of the casing string 40 and the exterior thereof via the primary and secondary circuits 94 and 96, respectively, the radial extents of the end portions 100a and 100b must be properly aligned with the high permeability zones 118 of the casing string 40.

Figure 9A:
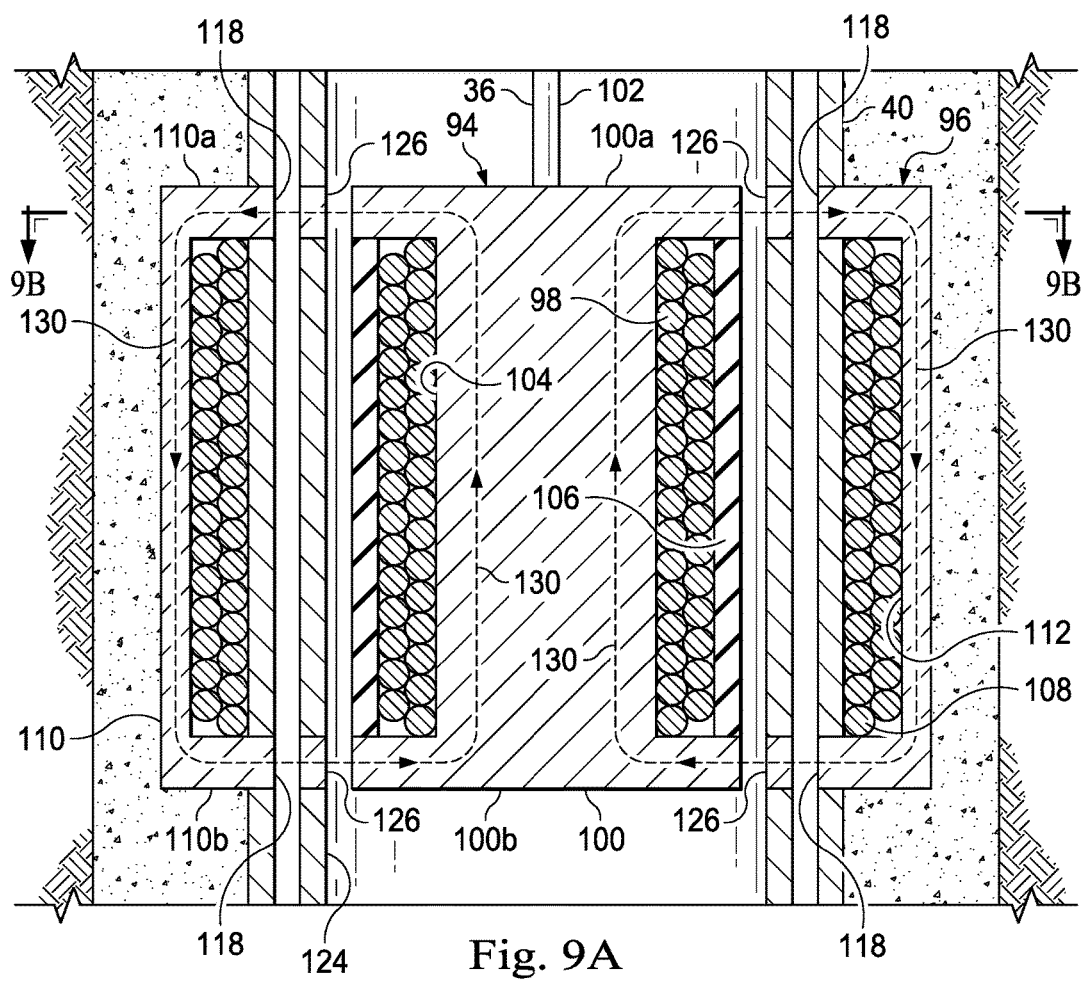
FIG. 9A is a cross-sectional elevational view of the primary and secondary circuits similar to the view illustrated in FIG. 8A, except that a second downhole tubular having zones of high magnetic permeability extends inside the downhole tubular and radially between the primary and secondary circuits, according to an exemplary embodiment.
Figure 9B:
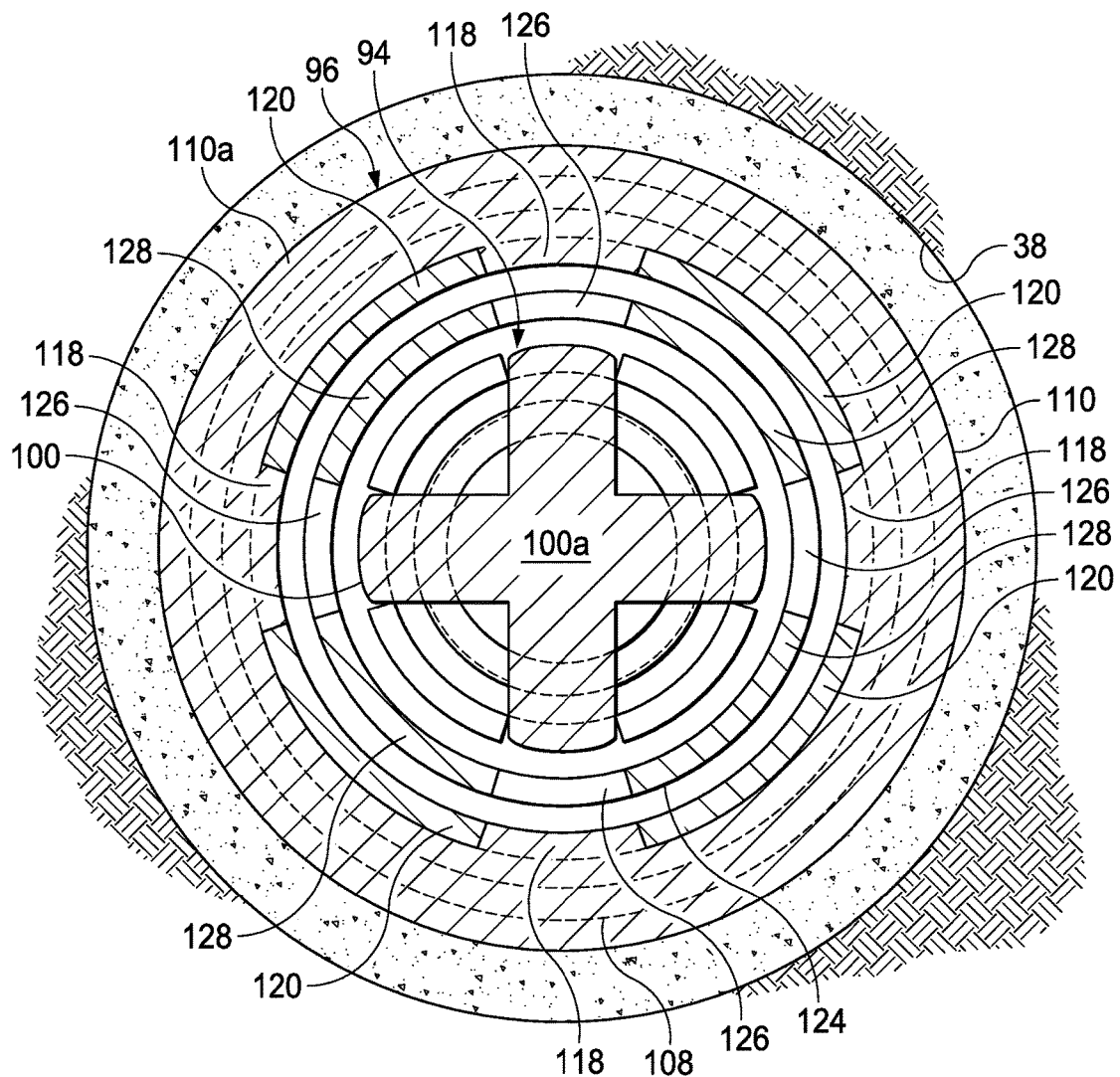
FIG. 9B is a cross-sectional view of the primary and secondary circuits, taken along the line 9B-9B of FIG. 9A, according to an exemplary embodiment.

Referring to FIGS. 9A and 9B, with continuing reference to FIGS. 8A and 8B, an embodiment is illustrated in which a tubing string 124 extends radially between the primary and secondary circuits 94 and 96, respectively. The tubing string 124 extends inside the casing string 40 so that an annular space is defined between the exterior of the tubing string 124 and the interior of the casing string 40. In an exemplary embodiment, a portion (or multiple portions) of the tubing string 124 (located interior and adjacent one (or respective ones) of the secondary circuits 96) is constructed to include zones of differing magnetic permeability. Specifically, the portion of the tubing string 124 located interior and adjacent the secondary circuit 96 is made of, for example, nonmagnetic steel (having a relative magnetic permeability of ~1) that is machined to introduce regions of high magnetic permeability at positions where the radial extents of the end portions 100a and 100b of the primary core 100 contact, or nearly contact, the interior of the tubing string 124.

As a result, multiple high permeability zones 126 are formed in the portion of the tubing string 124 located interior and adjacent the secondary circuit 96. Moreover, as shown in FIG. 9B, multiple corresponding low permeability zones 128 are interposed circumferentially between the high permeability zones 126 so that the high permeability zones 126 are disposed radially opposite one another. The high and low permeability zones 126 and 128, respectively, are incorporated into the tubing string 124 prior to the installation of the tubing string 124 into the casing string 40. The secondary circuit 96 is positioned around the casing string 40 at the location of the high and low permeability zones 118 and 120, respectively, so that the end portions 110a and 110b of the secondary core 110 are aligned with the high permeability zones 118 of the casing string 40. Moreover, the high and low permeability zones 126 and 128 of the tubing string 124 are positioned interior to, and aligned with, the respective high and low permeability zones 118 and 120 of the casing string 40.

In several exemplary embodiments, the respective end portions 100a and 100b of the primary core 100 are similar in size to the high permeability zones 126 of the tubing string 124. The radial extents of the end portions 100a and 100b are thus adapted to contact, or nearly contact, the high permeability zones 126. As shown in FIG. 9B, in several exemplary embodiments, the end portions 100a and 100b of the primary core 100 each define a generally cross-shaped profile (the end portion 100b is not visible in FIG. 9B). The cross-shaped profiles of the end portions 100a and 100b direct the flow of magnetic flux between the primary core 100 and the high permeability zones 126 of the tubing string 124. Moreover, in several exemplary embodiments, the high permeability zones 126 of the tubing string 124 are similar in size to the respective high permeability zones 118 of the casing string 40. The high permeability zones 126 of the tubing string 124 are thus adapted to contact, or nearly contact, the high permeability zones 118 of the casing string 40. In several exemplary embodiments, the size of the end portions 100a and 100b and/or the size of the high permeability zones 126 may be adjusted to permit varying amounts of misalignment therebetween.

In operation, with continuing reference to FIGS. 9A and 9B, the magnetic flux generated by the electrical current in the primary winding 98 passes through the respective high permeability zones 118 and 126 of the casing string 40 and the tubing string 124, as indicated by arrows 130. In contrast, the magnetic flux does not pass through the respective low permeability zones 120 and 128 of the casing string 40 and the tubing string 124. Thus, the high permeability zones 118 and 126 are used to channel the magnetic flux from the primary core 100 into the secondary core 110 to induce an electromotive force (EMF) or voltage in the secondary winding 108, as indicated by the arrows 130. In this manner, the high permeability zones 118 and 126 act to reduce efficiency losses during the transfer of power and/or data between the primary winding 98 and the secondary winding 108.

Any misalignment between the radial extents of the end portions 100a and 100b of the primary core 100 and the high permeability zones 126 of the tubing string 124 will prevent, or at least reduce, the induction of an electromotive force (EMF) or voltage in the secondary winding 108. Similarly, any misalignment between the respective high permeability zones 118 and 126 of the casing string 40 and the tubing string 124 will also prevent, or at least reduce, the induction of an electromotive force (EMF) or voltage in the secondary winding 108. Thus, to transfer power and/or data between the interior of the casing string 40 and the exterior thereof via the primary and secondary circuits 94 and 96, respectively, the radial extents of the end portions 100a and 100b must be properly aligned with the high permeability zones 126 of the tubing string 124. Moreover, the high permeability zones 126 of the tubing string 124 must be properly aligned with the high permeability zones 118 of the casing string 40.

In several exemplary embodiments, the respective radial thicknesses of the high permeability zones 118 and/or 126 of the casing string 40 and the tubing string 124 are adjusted to create closer proximity therebetween. Increased proximity between the high permeability zones 118 and 126 optimizes, or at least reduces, the magnetic reluctance between the primary and secondary circuits 94 and 96, respectively. Moreover, in several exemplary embodiments, the primary core 100 of the primary circuit 94 is located as close as is practicable to the interior of the tubing string 124 to optimize, or at least reduce, the magnetic reluctance between the primary and secondary circuits 94 and 96, respectively. As a result, the strength of the magnetic coupling between the primary winding 98 and the secondary winding 108 is improved.

Figure 10A:
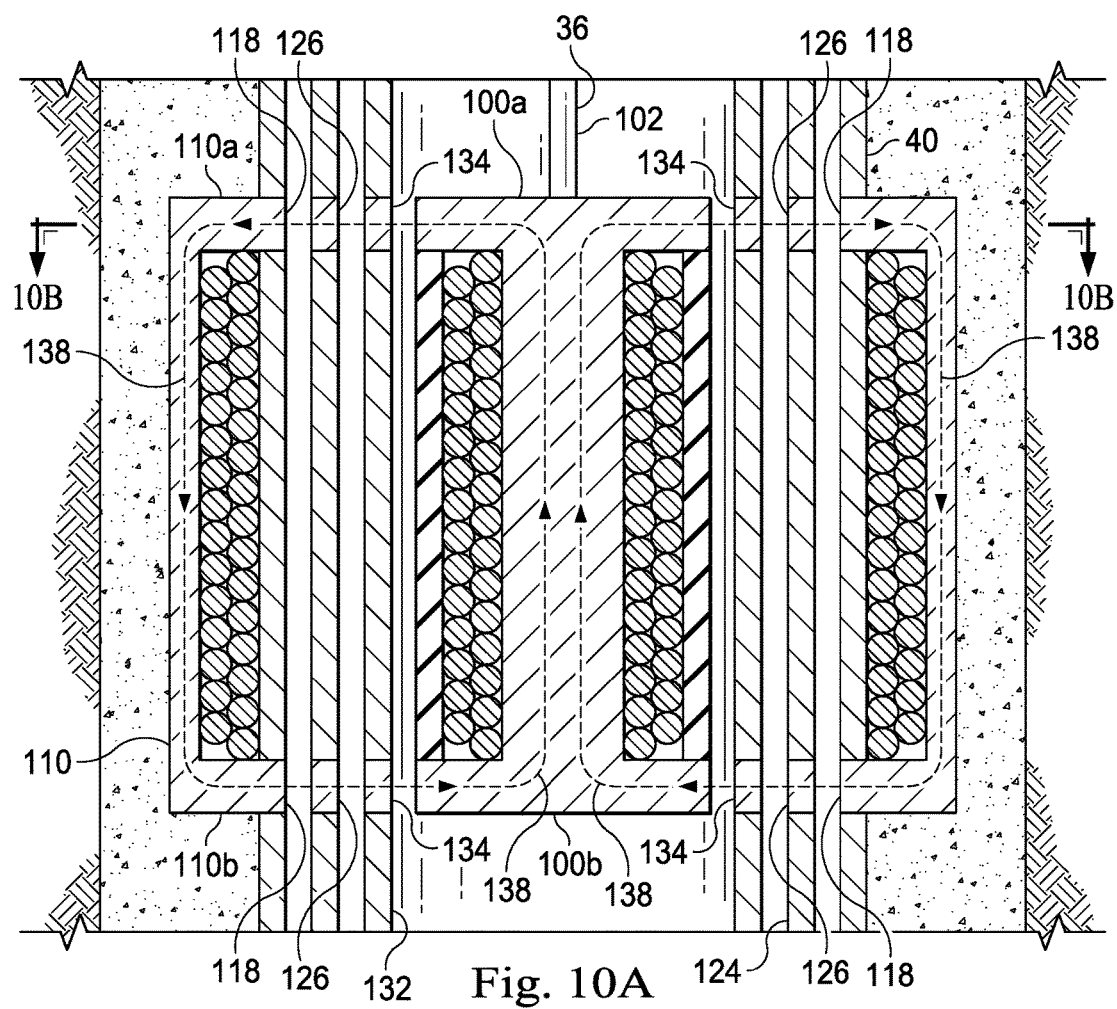
FIG. 10A is a cross-sectional elevational view of the primary and secondary circuits similar to the view illustrated in FIG. 9A, except that a third downhole tubular having zones of high magnetic permeability extends inside the second downhole tubular and radially between the primary and secondary circuits, according to an exemplary embodiment.
Figure 10B:
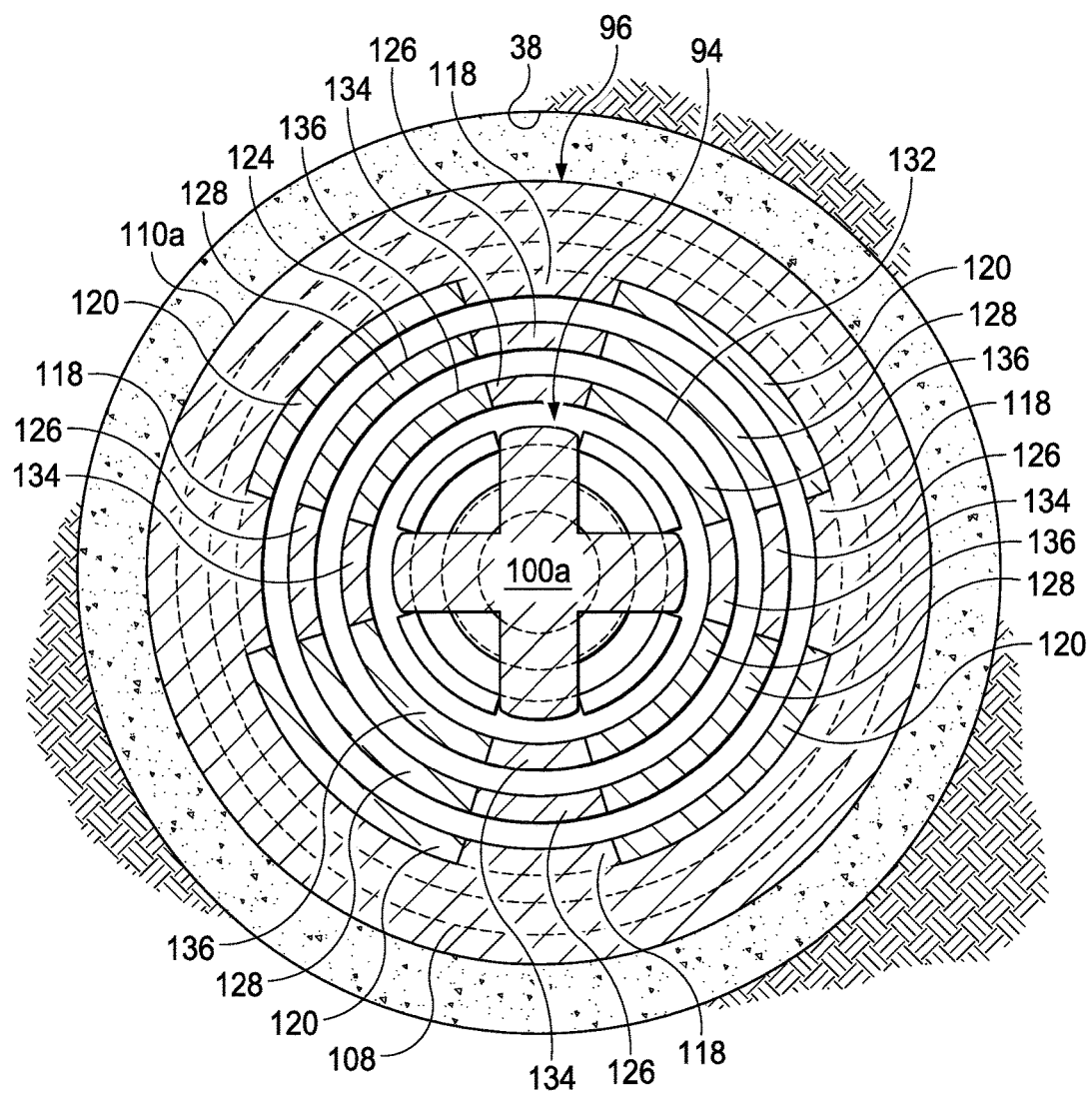
FIG. 10B is a cross-sectional view of the primary and secondary circuits, taken along the line 10B-10B of FIG. 10A, according to an exemplary embodiment.

Referring to FIGS. 10A and 10B, with continuing reference to FIGS. 8A, 8B, 9A, and 9B, an embodiment is illustrated in which a tubing string 132 extends radially between the primary and secondary circuits 94 and 96, respectively. The tubing string 132 extends inside the tubing string 124 so that an annular space is defined between the exterior of the tubing string 132 and the interior of the tubing string 124. In an exemplary embodiment, a portion (or multiple portions) of the tubing string 132 (located interior and adjacent one (or respective ones) of the secondary circuits 96) is constructed to include zones of differing magnetic permeability. Specifically, the portion of the tubing string 132 located interior and adjacent the secondary circuit 96 is made of, for example, nonmagnetic steel (having a relative magnetic permeability of ~1) that is machined to introduce regions of high magnetic permeability at positions where the radial extents of the end portions 100a and 100b of the primary core 100 contact, or nearly contact, the interior of the tubing string 132.

As a result, multiple high permeability zones 134 are formed in the portion of the tubing string 132 located interior and adjacent the secondary circuit 96. Moreover, as shown in FIG. 10B, multiple corresponding low permeability zones 136 are interposed circumferentially between the high permeability zones 134 so that the high permeability zones 134 are disposed radially opposite one another. The high and low permeability zones 134 and 136, respectively, are incorporated into the tubing string 132 prior to the installation of the tubing string 132 into the tubing string 124. The secondary circuit 96 is positioned around the casing string 40 at the location of the high and low permeability zones 118 and 120, respectively, so that the end portions 110a and 110b of the secondary core 110 are aligned with the high permeability zones 118 of the casing string 40. Further, the high and low permeability zones 126 and 128 of the tubing string 124 are positioned interior to, and aligned with, the respective high and low permeability zones 118 and 120 of the casing string 40. Further still, the high and low permeability zones 134 and 136 of the tubing string 132 are positioned interior to, and aligned with, the respective high and low permeability zones 126 and 128 of the tubing string 124.

In several exemplary embodiments, the respective end portions 100a and 100b of the primary core 100 are similar in size to the high permeability zones 134 of the tubing string 132. The radial extents of the end portions 100a and 100b are thus adapted to contact, or nearly contact, the high permeability zones 134. As shown in FIG. 10B, in several exemplary embodiments, the end portions 100a and 100b of the primary core 100 each define a generally cross-shaped profile (the end portion 100b is not visible in FIG. 10B). The cross-shaped profiles of the end portions 100a and 100b direct the flow of magnetic flux between the primary core 100 and the high permeability zones 134 of the tubing string 132. Further, in several exemplary embodiments, the high permeability zones 134 of the tubing string 132 are similar in size to the respective high permeability zones 126 of the tubing string 124. The high permeability zones 134 of the tubing string 132 are thus adapted to contact, or nearly contact, the high permeability zones 126 of the tubing string 124. Further still, in several exemplary embodiments, the high permeability zones 126 of the tubing string 124 are similar in size to the respective high permeability zones 118 of the casing string 40. The high permeability zones 126 of the tubing string 124 are thus adapted to contact, or nearly contact, the high permeability zones 118 of the casing string 40. In several exemplary embodiments, the size of the end portions 100a and 100b and/or the size of the high permeability zones 134 may be adjusted to permit varying amounts of misalignment therebetween.

In operation, with continuing reference to FIGS. 10A and 10B, the magnetic flux generated by the electrical current in the primary winding 98 passes through the respective high permeability zones 118, 126, and 134 of the casing string 40, the tubing string 124, and the tubing string 132, as indicated by arrows 138. In contrast, the magnetic flux does not pass through the respective low permeability zones 120, 128, and 136 of the casing string 40, the tubing string 124, and the tubing string 132. Thus, the high permeability zones 118, 126, and 134 are used to channel the magnetic flux from the primary core 100 into the secondary core 110 to induce an electromotive force (EMF) or voltage in the secondary winding 108, as indicated by the arrows 138. In this manner, the high permeability zones 118, 126, and 134 act to reduce efficiency losses during the transfer of power and/or data between the primary winding 98 and the secondary winding 108.

Any misalignment between the radial extents of the end portions 100a and 100b of the primary core 100 and the high permeability zones 134 of the tubing string 132 will prevent, or at least reduce, the induction of an electromotive force (EMF) or voltage in the secondary winding 108. Similarly, any misalignment between the respective high permeability zones 124 and 134 of the tubing strings 124 and 132, or any misalignment the respective high permeability zones 118 and 126 of the casing string 40 and the tubing string 132, will also prevent, or at least reduce, the induction of an electromotive force (EMF) or voltage in the secondary winding 108. Thus, to transfer power and/or data between the interior of the casing string 40 and the exterior thereof via the primary and secondary circuits 94 and 96, respectively, the radial extents of the end portions 100a and 100b must be properly aligned with the high permeability zones 126 of the tubing string 132. Further, the high permeability zones 134 of the tubing string 132 must be properly aligned with the high permeability zones 126 of the tubing string 132. Further still, the high permeability zones 126 of the tubing string 124 must be properly aligned with the high permeability zones 118 of the casing string 40.

In several exemplary embodiments, the respective radial thicknesses of the high permeability zones 126 and/or 134 of the casing string 40 and the tubing string 132 are adjusted to create closer proximity therebetween. Similarly, in several exemplary embodiments, the respective radial thicknesses of the high permeability zones 118 and/or 126 of the casing string 40 and the tubing string 124 are adjusted to create closer proximity therebetween. Increased proximity between the high permeability zones 118, 126, and/or 134 optimizes, or at least reduces, the magnetic reluctance between the primary and secondary circuits 94 and 96, respectively. Moreover, in several exemplary embodiments, the primary core 100 of the primary circuit 94 is located as close as is practicable to the interior of the tubing string 132 to optimize, or at least reduce, the magnetic reluctance between the primary and secondary circuits 94 and 96, respectively. As a result, the strength of the magnetic coupling between the primary winding 98 and the secondary winding 108 is improved.

Figure 11:
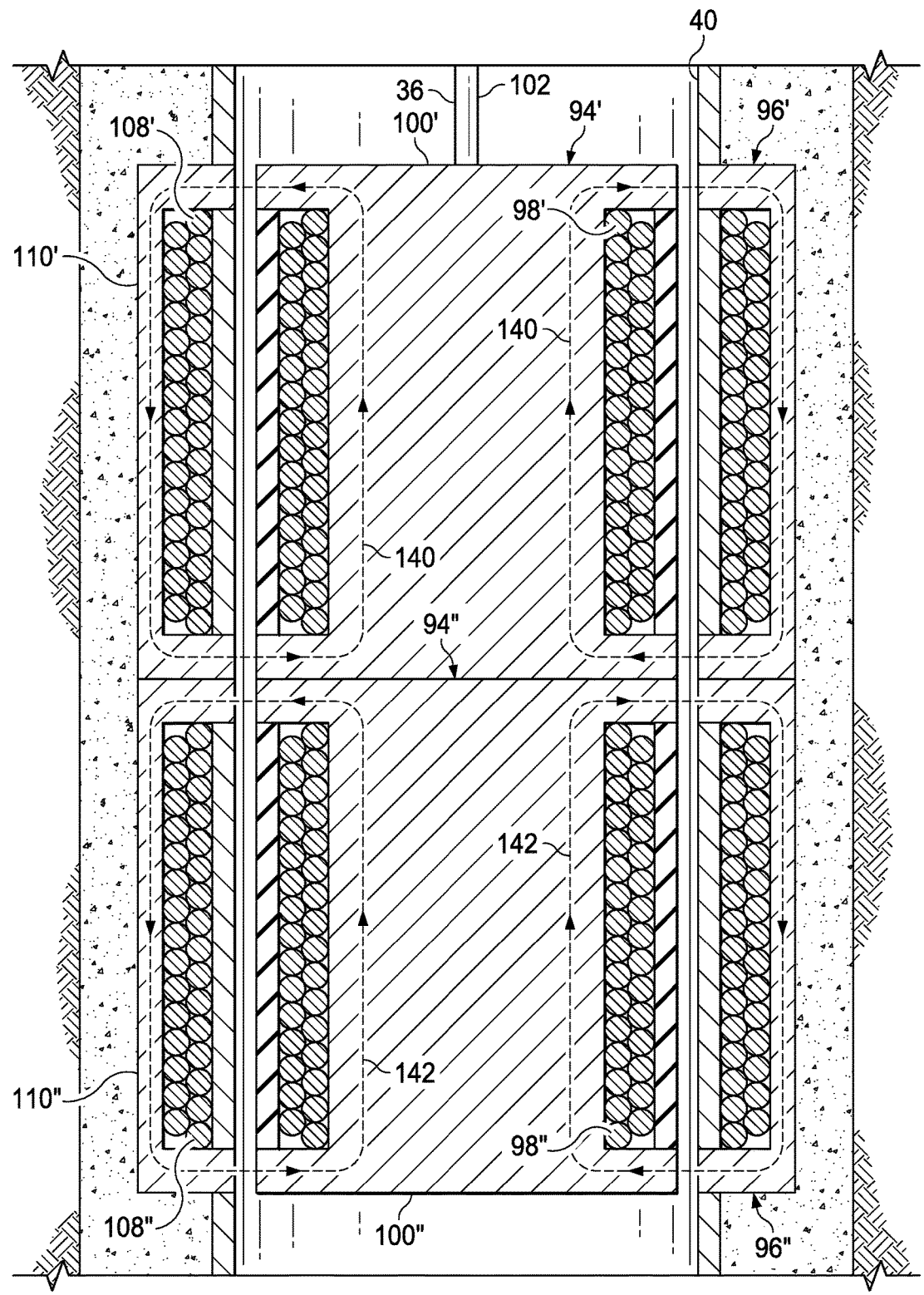
FIG. 11 is a cross-sectional elevational view of the primary and secondary circuits similar to the view illustrated in FIG. 8A, except that respective pairs of the primary and secondary circuits are illustrated one on top of the other, according to an exemplary embodiment.

Referring to FIG. 11, with continuing reference to FIGS. 7A, 7B, 8A, 8B, 9A, 9B, 10A, and 10B, an embodiment is illustrated in which a pair of the primary circuits 94 (referred to by the reference numerals 94' and 94") are arranged one on top of the other and connected to the electrical source (not visible in FIG. 11) via the cable 102. A corresponding pair of the secondary circuits 96 (referred to by the reference numerals 96' and 96") are arranged one on top of the other and positioned around the casing string 40. The structure and operation of the primary circuits 94' and 94" are substantially identical to the structure and operation of the primary circuit(s) 94 described above. Accordingly, components of the primary circuits 94' and 94" are given the same reference numerals as the components of the primary circuit(s) 94 described above, but the suffixes "'" and "''", respectively, are added to indicate whether a particular component is associated with the primary circuit 94' or the primary circuit 94". Moreover, the structure and operation of the secondary circuits 96' and 96" are substantially identical to the structure and operation of the secondary circuit(s) 96 described above. Accordingly, components of the secondary circuits 96' and 96" are given the same reference numerals as the components of the secondary circuit(s) 96 described above, but the suffixes "'" and "''", respectively, are added to indicate whether a particular component is associated with the secondary circuit 96' or the secondary circuit 96".

In operation, with continuing reference to FIG. 11, the respective primary circuits 94' and 94" are positioned within the casing string 40 to communicate electrically with the secondary circuits 96' and 96". More particularly, the primary windings 98' and 98", the primary cores 100' and 100", the secondary windings 108' and 108", and the secondary cores 110' and 110" are used to transfer power and/or data between the interior of the casing string 40 and the exterior thereof, through a process of electromagnetic induction. The process is initiated by providing an electrical current to the primary windings 98' and 98" via the cable 102. The electrical current flows through the primary windings 98' and 98" to create magnetic fields. The magnetic fields generated by the electrical current in the primary windings 98' and 98" induce a magnetic flux in the primary cores 100' and 100", respectively, as indicated by arrows 140 and 142. The magnetic flux prefers to flow through material having a high magnetic permeability. As a result, the magnetic flux generated in the respective primary cores 100' and 100" passes through the casing 40 and into the secondary cores 110' and 110", generally following the magnetic field created by the electrical current in the primary windings 98' and 98", respectively, as indicated by the arrows 140 and 142. In several exemplary embodiments, the primary core 100' is located as close as is practicable to the interior of the casing string 40 to optimize, or at least reduce, the magnetic reluctance between the primary circuit 94' and the secondary circuit 96'. Similarly, in several exemplary embodiments, the primary core 100" is located as close as is practicable to the interior of the casing string 40 to optimize, or at least reduce, the magnetic reluctance between the primary circuit 94" and the secondary circuit 96". As a result, the strength of the magnetic coupling between the respective primary windings 98' and 98" and the secondary windings 108' and 108" is improved. The magnetic flux flowing through the secondary cores 110' and 110" induces an electromotive force (EMF) or voltage in the secondary windings 108' and 108", respectively. The voltage in the secondary windings 108' and 108" may then be used to communicate electrically with a variety of out-of-casing sensors or electronics such as, for example, the sensors 48 (visible in FIGS. 1A and 1B).

The present disclosure introduces a method of establishing electrical communication between a primary circuit positioned inside a first downhole tubular and a secondary circuit positioned outside the first downhole tubular, the method including positioning the secondary circuit outside the first downhole tubular, the secondary circuit including a magnetically permeable secondary core and a secondary winding extending proximate the secondary core; positioning a primary circuit inside the first downhole tubular, the primary circuit including a magnetically permeable primary core and a primary winding extending proximate the primary core; and supplying electrical power and/or data to the primary winding with an electrical source so that a magnetic flux is channeled through the primary and secondary cores to induce an electromotive force in the secondary winding, thus establishing electrical communication between the primary and secondary circuits to transfer power and/or data therebetween. In an exemplary embodiment, the primary circuit is incorporated into at least one of: a wireline tool and a packer. In an exemplary embodiment, the method further includes operably associating the secondary winding with a downhole component positioned outside the first downhole tubular so that the downhole component is in electrical communication with the primary circuit via at least the secondary circuit. In an exemplary embodiment, the secondary core is split longitudinally into a pair of core sections separated by a corresponding pair of gaps so that the magnetic flux is only channeled through the primary and secondary cores when the primary core is aligned with the gaps. In an exemplary embodiment, multiple zones of high magnetic permeability and multiple zones of low magnetic permeability are formed in the first downhole tubular, the zones of low magnetic permeability being interposed circumferentially between the zones of high magnetic permeability. In an exemplary embodiment, when the electrical power and/or data is supplied to the primary winding with the electrical source, the magnetic flux is additionally channeled through the zones of high magnetic permeability. In an exemplary embodiment, positioning the primary circuit inside the first downhole tubular includes aligning the primary core with the zones of high magnetic permeability; and positioning the secondary circuit outside the first downhole tubular includes aligning the secondary core with the zones of high magnetic permeability. In an exemplary embodiment, the method further includes positioning a second downhole tubular inside the first downhole tubular and radially between the primary and secondary circuits so that the primary circuit is positioned inside the second downhole tubular. In an exemplary embodiment, multiple zones of high magnetic permeability and multiple zones of low magnetic permeability are formed in the second downhole tubular, the zones of low magnetic permeability being interposed circumferentially between the zones of high magnetic permeability. In an exemplary embodiment, when the electrical power and/or data is supplied to the primary winding with the electrical source, the magnetic flux is additionally channeled through the zones of high magnetic permeability.

The present disclosure also introduces a system, including a first downhole tubular; a primary circuit adapted to be positioned inside the first downhole tubular, the primary circuit including a magnetically permeable primary core and a primary winding extending proximate the primary core; an electrical source adapted to supply electrical power and/or data to the primary winding; and a secondary circuit adapted to be positioned outside the first downhole tubular, the secondary circuit including a magnetically permeable secondary core and a secondary winding extending proximate the secondary core; wherein, when the primary circuit is positioned inside the first downhole tubular, the secondary circuit is positioned outside the first downhole tubular, and the electrical source supplies the electrical power and/or data to the primary winding: a magnetic flux is channeled through the primary and secondary cores to induce an electromotive force in the secondary winding, thus establishing electrical communication between the primary and secondary circuits to transfer power and/or data therebetween. In an exemplary embodiment, the primary circuit is incorporated into at least one of: a wireline tool and a packer. In an exemplary embodiment, the secondary winding is operably associated with a downhole component positioned outside the first downhole tubular so that the downhole component is in electrical communication with the primary circuit via at least the secondary circuit. In an exemplary embodiment, the secondary core is split longitudinally into a pair of core sections separated by a corresponding pair of gaps so that the magnetic flux is only channeled through the primary and secondary cores when the primary core is aligned with the gaps. In an exemplary embodiment, multiple zones of high magnetic permeability and multiple zones of low magnetic permeability are formed in the first downhole tubular, the zones of low magnetic permeability being interposed circumferentially between the zones of high magnetic permeability. In an exemplary embodiment, when the electrical source supplies the electrical power and/or data to the primary winding, the magnetic flux is additionally channeled through the zones of high magnetic permeability. In an exemplary embodiment, the primary circuit is positioned inside the first downhole tubular at the location of the zones of high and low magnetic permeability so that the primary core is aligned with the zones of high magnetic permeability; and the secondary circuit is positioned outside the first downhole tubular at the location of the zones of high and low magnetic permeability so that the secondary core is aligned with the zones of high magnetic permeability. In an exemplary embodiment, a second downhole tubular extends inside the first downhole tubular and radially between the primary and secondary circuits so that the primary circuit is positioned inside the second downhole tubular. In an exemplary embodiment, multiple zones of high magnetic permeability and multiple zones of low magnetic permeability are formed in the second downhole tubular, the zones of low magnetic permeability being interposed circumferentially between the zones of high magnetic permeability. In an exemplary embodiment, when the electrical source supplies electrical power and/or data to the primary winding, the magnetic flux is additionally channeled through the zones of high magnetic permeability.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A method of establishing electrical communication between a primary circuit positioned inside a first downhole tubular and a secondary circuit positioned outside the first downhole tubular, the method comprising:
    positioning the secondary circuit outside the first downhole tubular, the secondary circuit comprising a magnetically permeable secondary core and a secondary winding extending proximate the secondary core, and the first downhole tubular including a plurality of zones of higher magnetic permeability and a plurality of zones of lower magnetic permeability, the respective zones of higher and lower magnetic permeability alternating along a circumference of the first downhole tubular so that a cross section taken perpendicular to a longitudinal axis of the first down hole tubular includes both the zones of higher and lower magnetic permeability;
    positioning the primary circuit inside the first downhole tubular, the primary circuit comprising a magnetically permeable primary core and a primary winding extending proximate the primary core; and
    supplying electrical power and/or data to the primary winding with an electrical source so that a magnetic flux is channeled through the primary core, the zones of higher magnetic permeability in the first downhole tubular, and the secondary core to induce an electromotive force in the secondary winding, thus establishing electrical communication between the primary and secondary circuits to transfer power and/or data therebetween.

2. The method of claim 1, wherein the primary circuit is incorporated into at least one of: a wireline tool and a packer.

3. The method of claim 1, further comprising operably associating the secondary winding with a downhole component positioned outside the first downhole tubular so that the downhole component is in electrical communication with the primary circuit via at least the secondary circuit.

4. The method of claim 1, wherein positioning the primary circuit inside the first downhole tubular comprises aligning the primary core with the zones of higher magnetic permeability; and
    wherein positioning the secondary circuit outside the first downhole tubular comprises aligning the secondary core with the zones of higher magnetic permeability.

5. The method of claim 1, further comprising positioning a second downhole tubular inside the first downhole tubular and radially between the primary and secondary circuits so that the primary circuit is positioned inside the second downhole tubular.

6. The method of claim 5, wherein the second downhole tubular includes a plurality of zones of higher magnetic permeability and a plurality of zones of lower magnetic permeability, the respective zones of higher and lower magnetic permeability alternating along a circumference of the second downhole tubular so that a cross section taken perpendicular to a longitudinal axis of the second downhole tubular includes both the zones of higher and lower magnetic permeability.

7. The method of claim 6, wherein, when the electrical power and/or data is supplied to the primary winding with the electrical source, the magnetic flux is additionally channeled through the zones of higher magnetic permeability in the second downhole tubular.

8. The method of claim 6, wherein the zones of high magnetic permeability in the second downhole tubular are integrally formed with the secondary core.

9. The method of claim 1, wherein the zones of high magnetic permeability in the first downhole tubular are integrally formed with the secondary core.

10. A system, comprising:
a first downhole tubular including a plurality of zones of higher magnetic permeability and a plurality of zones of lower magnetic permeability, the respective zones of higher and lower magnetic permeability alternating along a circumference of the first downhole tubular so that a cross section taken perpendicular to a longitudinal axis of the first downhole tubular includes both the zones of higher and lower magnetic permeability;
a primary circuit adapted to be positioned inside the first downhole tubular, the primary circuit comprising a magnetically permeable primary core and a primary winding extending proximate the primary core;
an electrical source adapted to supply electrical power and/or data to the primary winding; and
a secondary circuit adapted to be positioned outside the first downhole tubular, the secondary circuit comprising a magnetically permeable secondary core and a secondary winding extending proximate the secondary core;
wherein, when the primary circuit is positioned inside the first downhole tubular, the secondary circuit is positioned outside the first downhole tubular, and the electrical source supplies the electrical power and/or data to the primary winding: a magnetic flux is channeled through the primary core, the zones of higher magnetic permeability in the first downhole tubular, and the secondary core to induce an electromotive force in the secondary winding, thus establishing electrical communication between the primary and secondary circuits to transfer power and/or data therebetween.

11. The system of claim 10, wherein the primary circuit is incorporated into at least one of: a wireline tool and a packer.

12. The system of claim 10, wherein the secondary winding is operably associated with a downhole component positioned outside the first downhole tubular so that the downhole component is in electrical communication with the primary circuit via at least the secondary circuit.

13. The system of claim 10, wherein the primary circuit is positioned inside the first downhole tubular at the location of the zones of higher and lower magnetic permeability so that the primary core is aligned with the zones of higher magnetic permeability; and
wherein the secondary circuit is positioned outside the first downhole tubular at the location of the zones of higher and lower magnetic permeability so that the secondary core is aligned with the zones of higher magnetic permeability.

14. The system of claim 10, wherein a second downhole tubular extends inside the first downhole tubular and radially between the primary and secondary circuits so that the primary circuit is positioned inside the second downhole tubular.

15. The system of claim 14, wherein the second downhole tubular includes a plurality of zones of higher magnetic permeability and a plurality of zones of lower magnetic permeability, the respective zones of higher and lower magnetic permeability alternating along a circumference of the second downhole tubular so that a cross section taken perpendicular to a longitudinal axis of the second downhole tubular includes both the zones of higher and lower magnetic permeability.

16. The system of claim 15, wherein, when the electrical source supplies electrical power and/or data to the primary winding, the magnetic flux is additionally channeled through the zones of higher magnetic permeability in the second downhole tubular.

17. The system of claim 15, wherein the zones of high magnetic permeability in the second downhole tubular are integrally formed with the secondary core.

18. The system of claim 10, wherein the zones of high magnetic permeability in the first downhole tubular are integrally formed with the secondary core.

* * * * *